(12) United States Patent
Mital et al.

(10) Patent No.: US 6,189,012 B1
(45) Date of Patent: *Feb. 13, 2001

(54) APPARATUS AND METHOD FOR STORING, NAVIGATING AMONG AND ADDING LINKS BETWEEN DATA ITEMS

(75) Inventors: Vijay Mital, Watford; Peter Maude, Harrogate, both of (GB)

(73) Assignee: Melting Point Limited (GB)

(*) Notice: Under 35 U.S.C. 154(b), the term of this patent shall be extended for 0 days.

This patent is subject to a terminal disclaimer.

(21) Appl. No.: 09/396,677

(22) Filed: Sep. 10, 1999

Related U.S. Application Data

(63) Continuation of application No. 09/012,709, filed on Jan. 23, 1998, now Pat. No. 6,003,040.

(51) Int. Cl.[7] .................................................. G06F 17/30
(52) U.S. Cl. .............................. 707/103; 707/3; 707/100; 345/335; 345/346; 345/355
(58) Field of Search ................................. 707/3, 103, 100; 345/346, 355, 335

(56) References Cited

U.S. PATENT DOCUMENTS

| | | | |
|---|---|---|---|
| 5,187,786 | 2/1993 | Densmore et al. | 707/3 |
| 5,257,185 | 10/1993 | Farley et al. | 707/100 |
| 5,295,242 | * 3/1994 | Mashruwala et al. | 395/356 |
| 5,295,261 | 3/1994 | Simonetti | 707/2 |
| 5,446,902 | 8/1995 | Islam | 395/703 |
| 5,560,014 | 9/1996 | Imamura | 395/701 |
| 5,586,326 | 12/1996 | Ryu et al. | 395/701 |
| 5,627,979 | * 5/1997 | Chang et al. | 345/335 |
| 5,630,125 | 5/1997 | Zellweger | 707/103 |
| 5,659,751 | 8/1997 | Heninger | 709/305 |
| 5,855,013 | 12/1998 | Fisk | 707/3 |
| 5,977,967 | 11/1999 | Berner et al. | 345/335 |

OTHER PUBLICATIONS

Poweroffice White Paper, pp. 1–9; obtained from the Internet at "http://www.ezpower.com/", Anonymous.

* cited by examiner

Primary Examiner—Jean R. Homere
(74) Attorney, Agent, or Firm—Charles J. Kulas; Townsend and Townsend and Crew, LLP

(57) ABSTRACT

Information, or data, among applications in multiple diverse computer systems is represented in a uniform way allowing the data to be easily manipulated, navigated and modified. Each piece of information is stored as a uniquely identifiable object instance of one of multiple uniquely identifiable object classes that are themselves instances of a Root class. Two object instances can be linked by a uniquely identifiable two-way navigable link of a particular links class. Each link of a links class is constrained to linking object instances of either one or two different object classes. Each link also has a corresponding object instance such that the object class of the corresponding object instance is the links class, and the unique identifier of the object instance is the same in value as the unique identifier of the link. In the preferred embodiment, all object instances are held in a single relational table with only three columns, while all the links are held in a second relational table with only two columns. The data that is displayed when an object instance is selected is held in a separate details table for each object class, with the necessary relational join between a details table and the object instance table being efficient due to a one to one relationship involved in the join. The only other data that is normally involved or required to be searched during navigation is held in a data dictionary that is much smaller in size than the other data in the system of this invention. A graphical user interface is provided that presents the data as a hierarchical tree structure based on a primary object. Any object may be selected as the primary object. Circular relationships are supported and displayed. Object and link classes may be excluded from the display as desired.

6 Claims, 19 Drawing Sheets

Microfiche Appendix Included
(19 Microfiche, 1820 Pages)

| oid (30) | ocid (31) |
|---|---|
| 1 | <nul> |
| 13 | 1 |
| 14 | 1 |
| 15 | 1 |
| 16 | 1 |
| 17 | 1 |
| 18 | 1 |
| 218 | 13 |
| 219 | 13 |
| 375 | 13 |
| 418 | 13 |
| 419 | 13 |
| 521 | 15 |
| 522 | 15 |
| 563 | 15 |
| 564 | 15 |
| 613 | 14 |
| 614 | 14 |
| 622 | 14 |
| 998 | 13 |
| 999 | 15 |
| 2037 | 16 |
| 2039 | 16 |
| 2042 | 16 |
| 2055 | 17 |
| 2057 | 18 |
| 2931 | 16 |
| 2932 | 17 |
| 2937 | 16 |
| 2949 | 17 |
| 3007 | 18 |

Fig. 2

| oid | Links Class | Starting ocid | Display name | View |
|---|---|---|---|---|
| 13 | N | <null> | People | ... |
| 14 | N | <null> | Departments | ... |
| 15 | N | <null> | Cars | ... |
| 16 | Y | 13 | Departments | ... |
| 16 | Y | 14 | Employees | ... |
| 17 | Y | 13 | Drives | ... |
| 17 | Y | 15 | Driven by | ... |
| 18 | Y | 13 | Designed Cars | ... |
| 18 | Y | 15 | Designed by | ... |

Fig. 4

Data to Display, Data for Pointers

| ocid | Type | Fieldname in the Details Table of the Class | Position | Driver i/d |
|---|---|---|---|---|
| 999 | Display | PrimaryDetail_DisplayField1 | 1 | nul |
| -do- | Display | PrimaryDetail_DisplayField2 | 2 | nul |
| -do- | Pointer | PrimaryDetail_PointerField1 | 1 | D1 |
| -do- | Pointer | PrimaryDetail_PointerField2 | 2 | D1 |
| -do- | Pointer | PrimaryDetail_DisplayField2 | 3 | D1 |
| -do- | Pointer | PrimaryDetail_DisplayField2 | 1 | D2 |

93, 94, 95

Dynamic Views

| ocid | View i/d | SQL Statement | Stored Procedure path | Program Path |
|---|---|---|---|---|
| 999 | 2012 | ... | ... | ... |
| -do- | 2013 | ... | ... | ... |
| -do- | 2017 | ... | ... | ... |
| -do- | 2019 | ... | ... | ... |

98

Linked Rules

| ocid | link ocid | SQL Statement | Stored Procedure path | Program Path | max no of linked objects |
|---|---|---|---|---|---|
| 999 | 2012 | ... | ... | ... | ... |
| -do- | 2013 | ... | ... | ... | ... |
| -do- | 2017 | ... | ... | ... | ... |
| -do- | 2019 | ... | ... | ... | ... |

92

| View i/d | Displayable ocid |
|---|---|
| 2012 | 17 |
| 2012 | 18 |
| 2013 | 17 |
| 2013 | 16 |
| ... | ... |

97

External Drivers

| Driver i/d | Driver Path |
|---|---|
| D1 | ... |
| D2 | ... |

Fig. 8

| oid | Display Name |
|---|---|
| 613 | Research |
| 614 | Manufacturing |

| oid | ocid | lsid | ldid |
|---|---|---|---|
| 613 | 16 | 375 | 613 |
| 614 | 16 | 375 | 614 |

APPARATUS AND METHOD FOR STORING, NAVIGATING AMONG AND ADDING LINKS BETWEEN DATA ITEMS

CROSS REFERENCE TO RELATED APPLICATION

This application is a continuation of co-pending U.S. application Ser. No. 09/012,709, filed Jan. 23, 1998, entitled Apparatus and Method for Storing, Navigating Among and Adding Links Between Data Items, now U.S. Pat. No. 6,003,040.

BACKGROUND OF THE INVENTION

This invention relates in general to a system for storing, inter-linking, retrieving and displaying data, documents and other information held in one or more computer systems and specifically to such a system implemented with object oriented techniques.

The work done by any one user, or by a collaborating group, in a large organization is rarely encompassed by information or data inside one application or system alone, or satisfied by a single source of information. There are a huge number of meaningful relationships or links between the items of data and information held inside the diverse applications, systems and information sources (collectively referred as "systems" herein) that require users to frequently move from one item of data/information in one system to another item of data/information in another system. For example, a user looking at an electronic copy of a purchase order for some equipment may want to (a) see catalogue details describing the equipment's specifications and also commercial details of the supplier of said equipment, (b) see which other equipment is supplied by the same supplier, (c) see what faults have been reported about one of those said other items of equipment, and (d) see details of the engineer who reported one of these faults. Typically, the purchase order will be available in a purchase management system, the supplier details and the equipment details will be in a separate inventory database application, the faults will be reported in a fault tracking system, the engineer's personal details may come from a personnel directory system, the electronic images of the purchase order may be held in a document management system and pages of the catalogue may be published on an Internet or Intranet system.

The meaningful relationships or links can take a wide variety of forms and permutations. There can be more than one kind of link between items of data/information in two different systems. This may be so if a document in the document management system can be either a purchase order or correspondence from a same particular supplier. There are also situations where two or more different types of links or relationships exist at the same time between the same two items of data/information. A person versed in the art will understand that the situation being described involves potentially unrestricted many to many relationships between items of data and information in different systems. As such, there can be a whole range of many to many meaningful relationships between items of data and information in different systems that make sense to users. In order to serve different purposes, the user may want to follow the relationships in any order and in any permutation that is considered meaningful.

Collectively, the data and information available to users in an organization, along with meaningful relationships, not being bound by any restrictions of system boundary, can be said to constitute the organization's "knowledge". Of course, this is not an exhaustive definition of knowledge, for there is further knowledge that is added during usage of other knowledge, while there are yet other types of knowledge that are not held in any computer system or not held in a form discernible by a computer system such as in the form of paper, or in users' minds.

Some of the items of knowledge (note from above that links or relationships are items of knowledge) that users follow to move from one system to another are not originally present in any of the systems, and are instead added or recorded during the use of, or navigation among, knowledge. Such knowledge that is not originally present as aforesaid is, when it is necessary to distinguish it from knowledge present at a time or state immediately prior to said addition or recording, hereinafter referred to as "usage-added knowledge".

Examples of usage-created knowledge are (a) a note made by a user that certain items of data/information from two different systems should be seen together for a certain purpose, (b) addition of one or more types of links by a user between certain items of data/information from one or more systems for specific temporary or permanent purposes of the user, and (c) the fact that some other user has already seen or not yet seen a particular item of data/information. This usage-created knowledge, once added, becomes as much a part of the knowledge of the organization as any other knowledge that was previously present. Naturally, and importantly, the usage-created knowledge needs to be available for everything for which the pre-existing knowledge is available, including navigation or access by users and further addition or recording of usage-created knowledge.

Henceforth, the word "knowledge" shall, unless the contrary is expressly stated, include usage-created knowledge added or recorded up to the time or state to which reference is made. The word "links" shall include said relationships between items of data/information, as well as links made as a part of usage-created knowledge.

A person versed in the art will find it obvious that not all this usage-created knowledge can properly be stored or manipulated in any one of the individual systems, for much of this knowledge is about things that cross or straddle boundaries of two or more systems. As such, it is desirable to have means through which a wide range of usage-created knowledge can be added and interacted with, even though such knowledge cannot easily or properly be accommodated in any of the involved systems. Further, it is necessary for said means to accommodate usage-created knowledge involving items of data/information in new or newly related systems.

Further, when knowledge includes data and information from multiple systems, it is desirable to keep the changes in user interface, data structures and functionality of each of the separate systems down to a minimum. Many of these systems may have their own user interface, their own structures to hold data and information and relationships between them, their own security and other functionality, such as is specifically suitable to that particular system. As such, it is desirable to have a minimized domain of changes to the user interface, data structures and other special functionality of the various systems.

Further still, given the large number, high complexity and diversity in type of the many to many links comprised in the knowledge, and the diversity of the types of usage-created knowledge that can be added or recorded, there is the potential for the user interface for navigation of and interaction with the knowledge to become very complex. There can potentially be a bewildering range of choices faced by the user at every point during navigation or interaction with the knowledge. As such, it is desirable to have a minimized domain of user interface metaphors and choices, while continuing to have all the functionality to navigate and interact with knowledge involving diverse systems.

Moreover, a large number, high complexity and diversity in type of many to many links potentially places a high computational load during navigation of or interaction with knowledge, and during addition or recording of further links. As such, a scaleable means of storing, retrieving, navigating and adding of many to many links is required.

Another factor arises when there are a large number and type of possible links, and many of those links are made as part of usage-created knowledge. If the only thing that a user can do is to navigate manually, starting from one item and following through one or more paths, then much of the potential power of the links inside the knowledge is lost. Users can get valuable knowledge out of knowing things like whether and when a particular colleague has seen data/information items of a certain type, or what different types of links exist between two different items of data/information, or which items that are linked to a particular document have been seen a particular colleague within the last two days. This requires the ability to query the typed links in a multidimensional yet highly efficient manner. Where a particular query needs to be repeated, it is necessary to have the query performed as part of the normal user interface for navigation, in order to reduce the burden of complexity on the user.

As such, there is a need for a knowledge unification mechanism that enables users to navigate and interact with the countless meaningful many to many links between systems, including navigating, adding or recording of a wide range of usage-created knowledge that cannot easily be held in any one system providing data/information, such that this mechanism works without significantly altering or discarding the user interface, data structures and other special functionality of any of the linked systems, while providing a minimized domain of interface complexity for the user to navigate and interact with knowledge, further still providing for speed and computational efficiency during navigation and the addition or recording of usage-created knowledge, yet further providing efficient and dynamic querying involving a large number and variety of typed links.

There are numerous prior art ways to connect together the data and information in different systems or from different sources. One prior art method requires connected systems:

- to expose unique references or pointers to individual items of data/information in such a way that the operating system or the visual interface can pick up a copy of a reference when the user so indicates, and
- to provide the ability for the user to attach a copy of any said unique reference to specific items of data/information in another system.

An example of such prior art method is known to those versed in the art as Microsoft Object Linking and Embedding and variations or descendants thereof. Typically, when a user is working inside a particular system, wherever there is encountered an attached unique reference, in effect a link, to data/information in another system, the user is shown the link and given an option to follow said link. This method extends to linking two different items of data/information in the same system.

One limitation of this and similar prior art methods is that the links are not abstracted out of an individual system into a separate structure, i.e. each link is held within one or other of the linked systems. As such, this prior art method does not cope with a wide range of usage-created knowledge, especially of a type that cannot properly be held in any one of the connected systems. For example, a note made about two different items of data/information in two different systems can only be visible from within one of the systems.

Another limitation of this prior art method is that as a link is not visible unless the user has first accessed the data/information to which the link is attached, it is difficult for a user to get an overview of a chain of links involving multiple types of links. This makes the prior art unsuitable for navigation of knowledge where there are a large number of possible many to many links.

Another prior art method involves holding said links between data/information in multiple systems inside a separate database. In effect, each link is achieved by holding references or pointers to the two linked items as values in the fields of a database. As the links are abstracted or taken away from the systems involved, further data can be added to the links and also there can be a large number of different types of links. Further still, each link can have an automatic counterpart in the reverse direction, allowing bidirectional navigation. Yet further, many such links can be created programmatically, for example on the basis of identity of values in nominated fields of the items of data/information being linked, i.e. through unique keys.

Prior art systems for navigating to information from multiple systems by holding links inside a relational database are disclosed in U.S. Pat. No. 5,257,185: "Interactive, cross-referenced knowledge system" and U.S. Pat. No. 5,630,125: "Method and apparatus for information management using an open hierarchical data structure". However, these prior art systems rely on information being organized in a hierarchical structure of topic and subtopic nodes with parent/child relationships. These topics and subtopics then serve as the primary keys for cross-referencing, as well as accessing and navigating the data/information. Such a constraint can only work when a knowledge delivery system is being authored for delivery to users, and is not easy to accommodate when systems with information/data already exist and their information may or may not exhibit any hierarchies of topics or subtopics, as is predicated in the circumstances for which the present invention provides a solution. The said constraint also applies to another prior art system, disclosed in U.S. Pat. No. 5,295,261 "Hybrid database structure linking navigational fields having a hierarchical database structure to informational fields having a relational database structure that provides for navigation of interlinked information."

An example of prior art that does not rely on the existence of topics and subtopics for navigation of data/information from multiple systems is a system marketed by EZPower Systems, Inc. under the name of EZPower. This prior art method uses data relationships from multiple systems by building multiple indexes on the nominated foreign keys in the records in these systems and then allows items of data and information, including documents and media objects, in the different systems to be navigated by means of these indexes. This prior art system does not exhibit the functionality of adding or recording usage-created knowledge that involve the linking between or linking of notes or other objects to items of data/information for which relationships are obtained as aforesaid.

None of the prior art systems discloses the synchronizing of items of data/information in external systems with the database holding the links within the knowledge, which means that the external systems cannot readily be used as the primary starting or searching points for information. Further, it is a limitation of those prior art systems that hold links between said items in a database that all paths of navigation end in leaf nodes or end points other than returning to an immediately prior node in a hierarchical or similar navigation. Consequently, even if there were provision for said synchronization, said external items can only be used as limited starting points in navigation through the interlinked knowledge.

None of the prior art systems discloses the ability to add or record on an ongoing basis usage-created knowledge in the sense described herein. In particular, the prior art systems do not disclose the ability, without serious restrictions, to add notes or any other item of data/information to any item of data/information, irrespective of the type of the latter or former item. The prior art does not disclose an ability to make the notes added to or multiple types of links made between items of data/information from multiple systems automatically available for navigation and addition or recording of further usage-created knowledge in the same manner as for pre-existing knowledge.

None of the prior art reveals a means that is scaleable or optimized for navigation of knowledge when the number of items of data and information as well as the number and variety of links between them is very large.

None of the prior art reveals the ability to keep the user interface reduced to a small number of interface concepts and options, irrespective of the complexity of interlinking of items of data and information.

SUMMARY OF THE INVENTION

The present invention comprises a method and apparatus for storing, navigating and adding a large number and variety of links between items of data and information from multiple systems such that each such system can continue to use its existing user interface to search and display items of data and information contained in that system. The navigation of the information remains efficient and easily understandable as the volume and complexity of interlinking of the data and information rises.

More specifically, the present invention comprises a method and apparatus for storing uniquely identifiable object instances of multiple uniquely identifiable object classes that are themselves instances of a Root class. Two object instances can be linked by a uniquely identifiable two-way navigable link of a particular links class. Each link of a links class is constrained to linking object instances of either one or two different object classes. Each link also has a corresponding object instance such that the object class of the corresponding object instance is the links class, and the unique identifier of the object instance is the same in value as the unique identifier of the link.

In the preferred embodiment, all object instances are held in a single relational table with only three columns, while all the links are held in a second relational table with only two columns. The data that is displayed when an object instance is selected is held in a separate details table for each object class, with the necessary relational join between a details table and the object instance table being efficient due to a one to one relationship involved in the join. The only other data that is normally involved or required to be searched during navigation is held in a data dictionary that is much smaller in size than the other data in the system of this invention.

Where an item of data/information to be linked by the system of this invention is held in an external system, the system of this invention holds an object instance along with a related record in the appropriate details table that holds a pointer such as can uniquely identify that item in the external system. This invention requires drivers to be written using methods obvious to one versed in the art such as can communicate pointers back and forth between system of this invention and an external system, and can additionally be invoked both when an item of data/information is selected in the external system and when the related object instance is selected in the system of this invention.

The data dictionary, firstly, contains a details table for the Root class that holds display names of object classes and names for links classes that can differ depending on the object class of the object instance from which the links to be displayed are perceived at the current time to start. The data dictionary, secondly, contains a class descriptor for each object class, with the class descriptor holding the identification of fields in the details table that hold the data to be displayed when an object instance is selected, the identification of fields in the details table that hold the data constituting pointers to uniquely identifiable items of data/information in an external system, and the identification of the external drivers that communicate pointers to an external system. The class descriptor also contains a list of dynamic views that restrict the display of object instances, along with SQL statements the define those restrictions of modifications.

In one preferred embodiment of the user interface to the system of this invention, the user is presented all object instances, collections of object instances and collections of links as folders in an endless hierarchy. Virtually the entire permutations of navigation in this endless hierarchy can be accommodated by a minimal set of three actions, involving the opening or expansion of a folder representing a collection of all object instances of a class to show those object instances, opening of a folder representing an object instance to show all link types of which there is at least one link linking the object instance, and the opening of a folder representing a collection of links involving a particular object instance to show the other object instances linked by those links. The processing involved in each of these actions of navigation is fast and efficient and grows only linearly as the number of linked items of data/information grows or the complexity of interlinks between items increases.

This invention also permits users to add new object instances and make additional links between any object instances, thence between related items of information, including newly added object instances.

Accordingly, it is an object of the invention to have a method and apparatus that allows many to many relationships or meaningful links (hereinafter called "links") between items of data and information from multiple systems, whether of this invention or not, to be held, added, navigated and queried in a computationally efficient manner, even when the number of linked items of data and information, and the number and variety of links becomes very large, and irrespective of the complexity or density of the linking. Said links and said items are collectively termed "knowledge", which includes "usage-created knowledge" in the sense of the Background, once created.

It is a further object of this invention to permit full and unrestricted navigation between items of data and information from multiple systems, while minimizing the changes necessary to the user interface, data structures and special functionality of each of the said systems.

It is another object of the invention to enable the creation and storage of such permitted new links, data and information (collectively termed "usage-created knowledge") as add meaning to the knowledge being navigated, while immediately after such creation making the usage-created knowledge available for further navigation, querying and further addition of usage-created knowledge in the same manner as the pre-existing knowledge.

It is yet another object of this invention to minimize the complexity and diversity of the user interface required to navigate and interact with knowledge, irrespective of the complexity or diversity of linking of items of data and information.

These and other objects of the present invention shall become apparent to those versed in the art from the following detailed description of the present invention and the accompanying drawings.

BRIEF DESCRIPTION OF THE DRAWINGS

FIG. 2 shows the illustrative data held in the object instance table;

FIG. 4 shows the primary details table for the Root class;

FIG. 8 shows class descriptors, including dynamic views, for object classes;

DESCRIPTION OF THE PREFERRED EMBODIMENT

A preferred embodiment of the invention is completely described in the microfiche Appendix which contains the source code for a product called MeltingPoint Pro Version 2. The source code is written in Borland Delphi versions 2 and 3. The compilation of the executable may be performed on either Windows 95 or NT4. The running environment is Windows 32-bit operating systems (e.g., Windows 95, NT4) on a client workstation and one of Oracle 8, Sybase 10,Microsoft SQL Server or Borland Interbase running on NT Server as the server.

The term "knowledge" is used in the collective sense referred to above in the Objects of the Invention.

Figure 1:
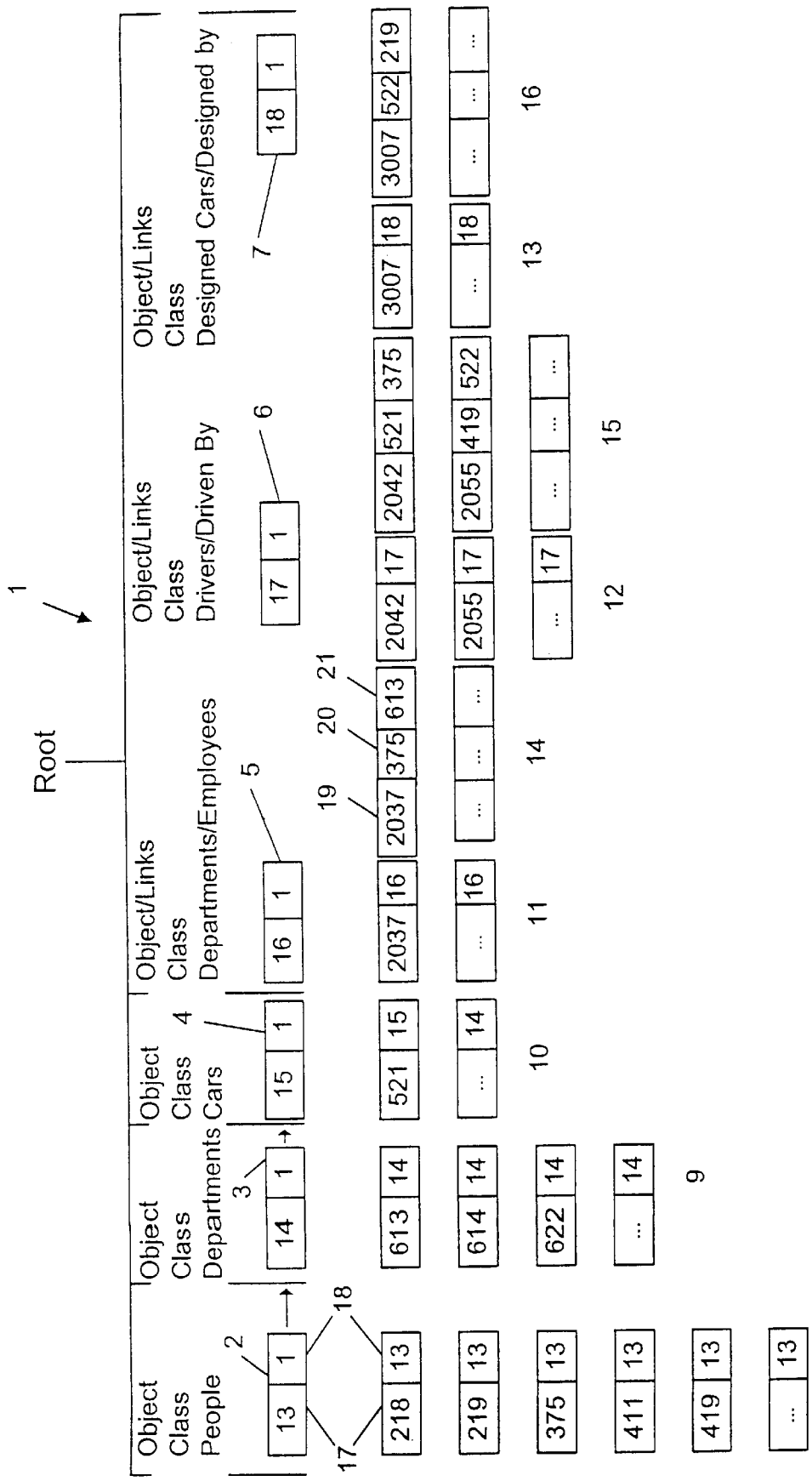
FIG. 1 is a diagram showing a schematic arrangement of object classes and object instances.
Figure 3:
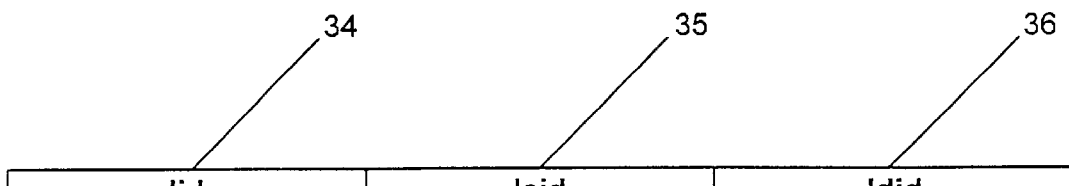
FIG. 3 shows illustrative data held in the links table.
Figure 6:
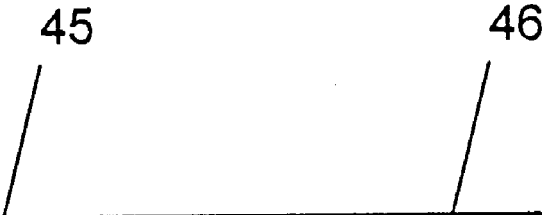
FIG. 6 shows the primary details table for the Departments object class.
Figure 7:
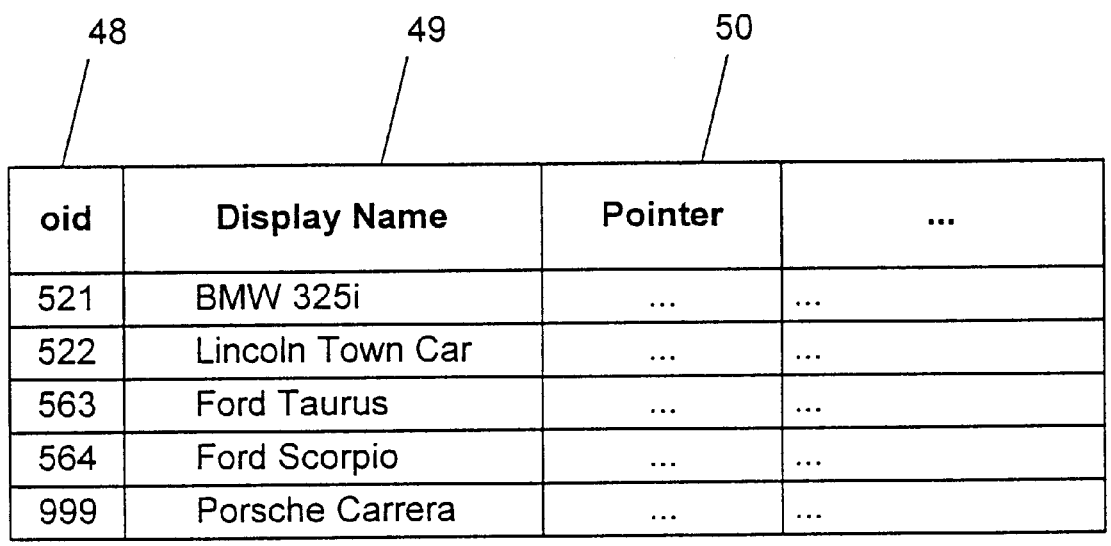
FIG. 7 shows the primary details table for the Cars object class.

According to the preferred embodiment, the Knowledge Unification System organizes all knowledge into the following:

a Root class, shown at block 1 in FIG. 1, of which all object classes, shown at blocks 2 to 7 in said Figure, are classes;

links classes, shown at blocks 5 to 7 in FIG. 1, that are also object classes;

instances of object classes ("object instances"), shown at blocks 8 to 13 in FIG. 1, that in the preferred embodiment are held in an object instance table, shown in FIG. 2;

links of links classes between two object instances ("links"), shown at blocks 14, 15 and 16 in FIG. 1, that in the preferred embodiment are held in a links table, shown in FIG. 3, with a corresponding object instance (blocks 11, 12 and 13 in FIG. 1) for each link, that in the preferred embodiment is held in said object instance table;

details data related to the Root class that is, in the preferred embodiment, held in at least one details table (the primary Root details table), shown in FIG. 4;

details data related to object instances, that, in the preferred embodiment, is held in at least one details table (the primary object details table, shown in FIG. 5, FIG. 6 and FIG. 7) for each object class, with one object instance being related to one record in such a primary details table, with further records of other or secondary details tables optionally also being related through other optional foreign keys in the primary details table, with the exception that object classes that are links classes need not have any primary or other details tables;

any items of data/information held in an external system being a system other than the Knowledge Unification System of this invention, such that each such item ("external data/information") is related to one object instance through a pointer held in one or more fields of a details table record that uniquely identifies said item, as illustrated in FIG. 5, FIG. 6, FIG. 7 and FIG. 16;

drivers ("external drivers"), being means of invoking, communicating to and instructing programs external to the system of this invention to display any external data/information, where each driver is uniquely related to one object class, while one object class may be related to more than one driver;

a data dictionary that contains for each object class a class descriptor, shown in FIG. 8, where a class descriptor is a body of data describing said object class, including data in which field or fields in the details table associated with said object class is displayed when the user wishes to display an object instance of said object class, which field or fields in said details table constitute a pointer for communication with an external system that holds an item of data/information uniquely identifiable by said pointer, and which external driver or drivers are to be invoked and given the fields constituting said pointer and which order of fields when the related object instance is selected by the user; optionally, the class descriptor contains a list of the available dynamic views, being restrictions on viewing and displaying object instances and links involving object instances of said object class, and any limitations on, and preconditions or post conditions of, the making of a link;

each dynamic view, also shown in FIG. 8, is part of a class descriptor and is used to restrict from being displayed some or all links involving object instances of a particular object class, and further holds search matching conditions or other preconditions that need to be satisfied in respect of an object instance of said object class before that object instance can be displayed; the said matching conditions can be held in multiple ways, including as SQL statements, stored SQL procedures, or programs that are executed.

Figure 18:
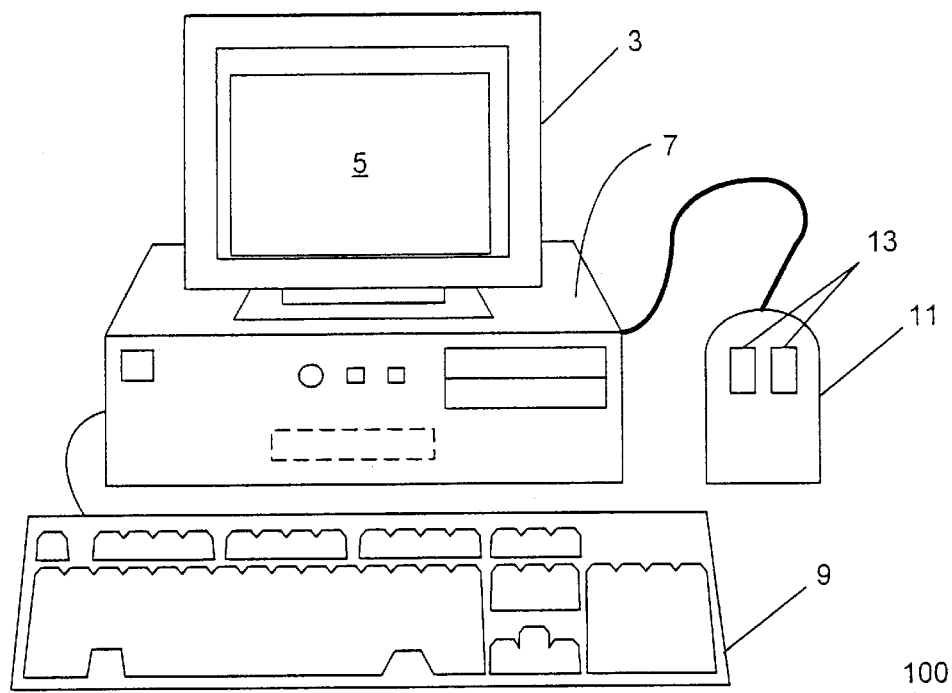
FIG. 18 shows a basic computer system suitable for executing the software of the present invention.

FIG. 18 shows a basic computer system 1 suitable for executing the software of the present invention. Computer system 1 includes a display device 3 with a display screen 5. Cabinet 7 houses additional components of the computer system (not shown) such as a processor, memory, disk drive, compact disc read only memory (CD-ROM), etc. Keyboard 9 and mouse 11 are standard user input devices. Mouse 11 includes buttons 13 for facilitating user input.

FIG. 18 shows a basic computer system 1 suitable for executing the software of the present invention. Computer system 1 includes a display device 3 with a display screen 5. Cabinet 7 houses additional components of the computer system (not shown) such as a processor, memory, disk drive, compact disc read only memory (CD-ROM), etc. Keyboard 9 and mouse 11 are standard user input devices. Mouse 11 includes buttons 13 for facilitating user input.

Figure 19:
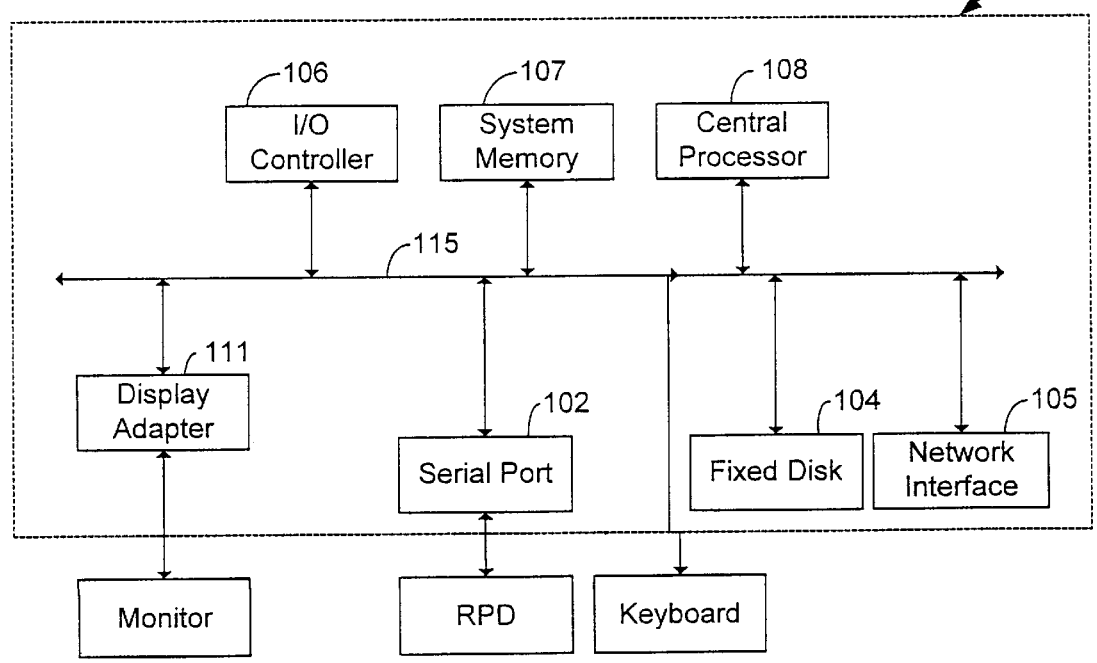
FIG. 19 shows subsystems in the computer system of FIG. 18.

FIG. 19 shows several subsystems interconnected via a bus 115. Central processor 108 communicates with system memory 107, fixed disk 104, I/O controller 106, display adapter 111, serial polt 102 and netowork interface 105 some subsystems interface to user input and output devices such as the monitor, remote pointing device (RPD) or, "mouse," and keyboard which are also shown in FIG. 18. Network interface 105 is used to connect the computer system to additional external computer systems on a network. Many other configurations of subsystems are possible. A computer system suitable for use with the present invention can use less subsystems, components or devices than those shown in FIG. 19. For example, a handheld computer may include only a processor, memory (both random-access memory (RAM) and read-only memory (ROM)), small display screen and keyboard. Also, computer systems suitable for use with the present invention may include more subsystems than are shown in FIG. 19. For example, the handheld computer may include a PCMCIA card interface for storing and retrieving data from an external card.

Figure 20:
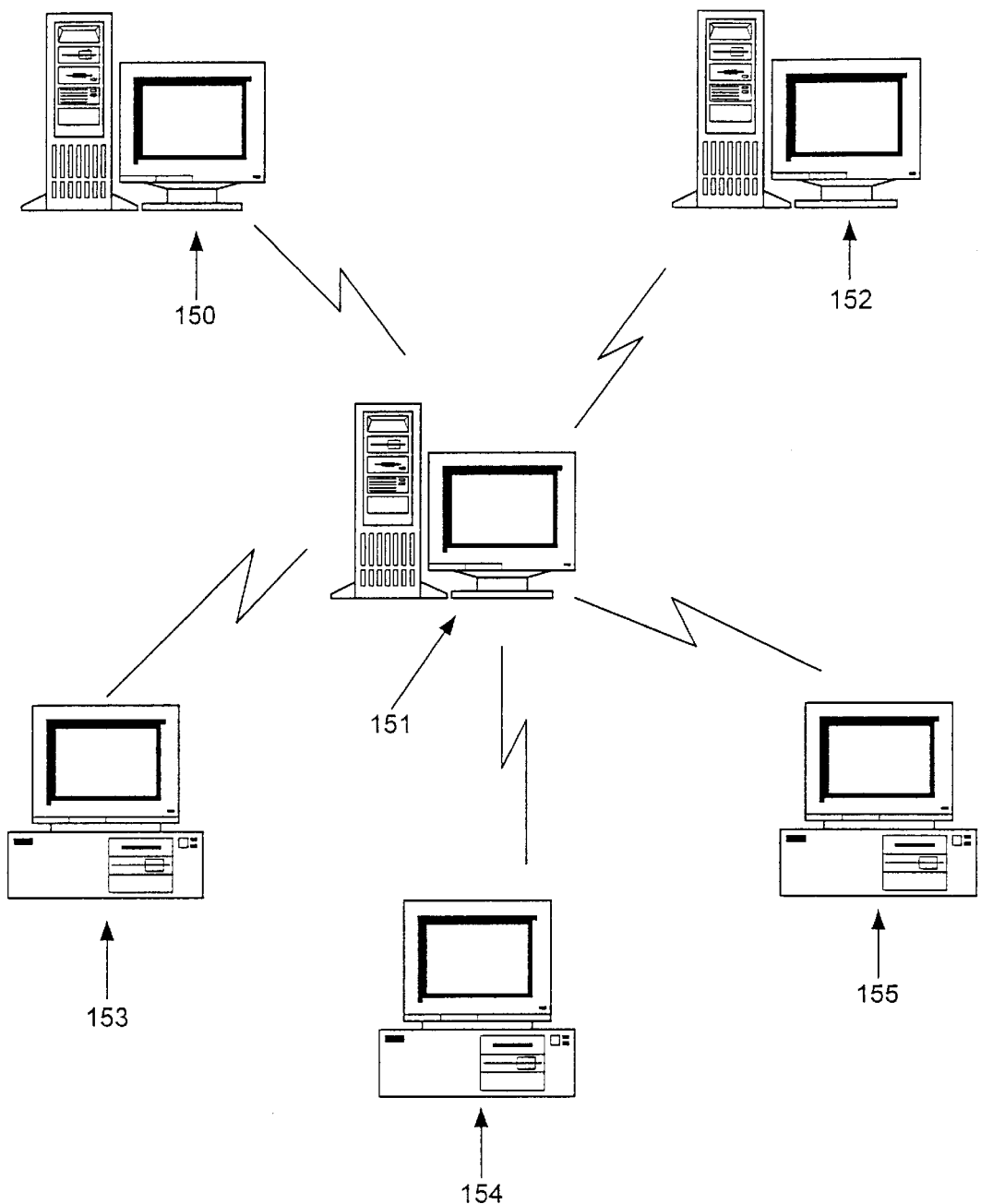
FIG. 20 shows a generalized computer network.

FIG. 20 shows a generalized computer network.

In FIG. 20, servers such as server 150, 151 and 152 may be interconnected by any communication means and in any network topology. For example, the servers can be connected by hardwire, radio frequency transmissions, infrared transmissions, etc. They can be connected in a star, ring, daisy chain, etc., schemes. Also, any communication protocol such as Ethernet, IEEE 1394 or TCP/IP can be employed.

User stations 153, 154 and 155 are shown connected to server 151. Again, the interconnection between the computer stations and the server, or servers, can be by any means, topology and protocol as is known. Although all of the computer stations are shown connected to server 151, additional servers having any number of additional computer stations can be added to the interconnected network of FIG. 20. Although the specific embodiment is discussed with reference to a single computer station, such as computer station 153, accessing a database on a server, such as server 151, it should be readily apparent that the database can be distributed over two or more servers or computers. Further, the database can exist partially, or completely, on the computer stations themselves. That is, computer station 153 can operate as a stand-alone database where the database engine, along with the data, auxiliary programs, etc. all reside within the computer station. The idea of distributed databases is well-known in the art. Many variations on distributing data, and many designs of database "front ends" or user interfaces are possible without deviating from the scope of the present invention.

FIG. 1 shows schematically the Root class as an umbrella class of all object classes. Each object class that is not a links class has a plurality of object instances. Each object class that is not a links class has a plurality of links and an object instance corresponding to each link.

As seen from FIG. 1, each object instance contains a unique object identifier or "oid" (block 17) and a unique object class identifier or "ocid" (block 18), being the oid of the object class to which said object instance belongs. In the illustration, the oid of the Root class is the integer 1. Said Figure shows that object classes (which includes links classes) are each represented by an object instance of the root class (blocks 2, 3, 4, 5, 6 and 7 in said Figure), each such object instance, therefore, showing the integer 1 as its ocid.

The three object classes illustrated in FIG. 1 that are not links classes are People, Departments and Cars. The object instances of People object class all have integer 13 as ocid, being the same integer value as is the oid of the object instance representing the People object class. Similarly, all object instances of Departments object class have ocid of integer 14, with integer 15 as the ocid of object instances of Cars object class.

The first links class illustrated in FIG. 1 is the Departments/Employees links class, with an oid of integer 16. The links in said links class each link an object instance of People object class (i.e. people) to an object instance of Departments object class (i.e. departments). For each link there is a unique identifier of the link or "lid" (block 19), the unique identifier of the first linked object instance (also called link source identifier or "lsid" —block 20) and the unique identifier of the second linked object instance (also called link destination identifier or "ldid" —block 21). As expected, the corresponding object instance of a link has as its ocid the oid of the links class to which the link belongs. Importantly, the said link's lid and the said object instance's oid are identical in value, so knowing one makes it possible to find the other.

Let us take the link in FIG. 1 with lid equal to integer 2037. This link links an object instance of People class (oid 375) to an object instance of the Departments class (oid 613). In the illustration the meaning is meant to be that the person oid 375 is in the department with oid 613; or, seen from an alternative perspective, person oid 375 is an employee in the department oid 613.

Similarly, FIG. 1 illustrates two other links classes. In the Drives/Driven by links class, one of the links (lid 2055) shows person oid 522 drives the car with oid 419; or, in other words, the car oid 419 is driven by person oid 522. In the Designed cars/Designed by links class, the link lid 3007 conveys the meaning that person oid 522 designed the car oid 219, or the car oid 219 was designed by person oid 522.

The constraint of any link class is that every link in that class is constrained to link two different object instances from the same specified object class or two different specified object classes. A link of a particular links class can link object instances from two different object classes (the first linked object instance from the first object class and the second linked object instance from the second object class). Links are bidirectional for the purpose of navigation, in the sense that they can be navigated or followed from either of the linked object instances. However, there can optionally be a directional element in links of such a links class. The directional element is provided by the links class having two different display names, one display name to be used when displaying a link or links starting from the first linked object instance, i.e. an object instance of the first object class, and the second display name to be used when showing links starting from the second linked object instance, i.e. an object instance of the second object class. The appropriate display name of a links class (hence of a link belonging to that links class) is obtained in the preferred embodiment from the primary details table of the Root class ("primary Root details table"), as shown in FIG. 4. In said primary Roots details table, the oid column is matched with the oid of the relevant links class; then the Starting ocid column and the Display name column give the name of the link when starting from an object instance with ocid matching the value in said Starting ocid column. The said primary Root details table also contains the display name of each object class that is not a links class.

As is obvious to one versed in the art, an implementation is possible that holds the appropriate display name of a link physically or logically together or directly connected with the corresponding link, so that no additional querying of a said details table is required. Similarly, it is obvious to one versed in the art that the ocid held in the object instance corresponding to a link can be held physically or logically together or directly connected with said link.

As is obvious to one versed in the art, it does not matter whether the oid of a linked object instance is placed in the ldid or lsid column of the links table, so long as the oid of the other linked object instance is placed in the other said column. For consistency, in the preferred embodiment, the oid of the object instance of an object class with the lower ocid value is placed in the lsid column.

It is clear from above that links are a way of representing, holding and navigating multiple relationships existing between object instances.

In the preferred embodiment, the object instances are held in a relational table ("the object instance table", as shown in FIG. 2), while the links are held in another relational table ("the links table", as shown in FIG. 3).

It shall be obvious to one versed in the art that it is possible to have some of the data contained in the said object instance table in respect of object instances corresponding to links as aforesaid to be duplicated in the said links table, so that two different tables do not have to be accessed for some of the retrievals of links described below. An example of this is the ocid of the said corresponding object instance being kept additionally in the links table.

Figure 5:
FIG. 5 shows the primary details table for the People object class.

For each object class (but, only optionally for an object class that is a links class) there is at least one details table ("primary object details table"). In the preferred embodiment, as shown in FIG. 5 for said People object class, the primary object details table is joinable to object instances through a foreign key on the oid. There is a one to one relationship between object instances of a class and the corresponding record in a primary object details table. Each record in the details table holds details data. There may optionally be further details tables ("secondary object details tables"—not illustrated in FIG. 5) which are in turn related through foreign keys—not illustrated in FIG. 5—to said primary object details table. These secondary object details tables are usable to provide additional information associated with object instances. The record of the primary object details table related to an object instance, along with any related records of secondary object details tables, are collectively referred to as the "object details record".

At the minimum, the object details record contains one or more display fields containing data that is displayed when the object instance is viewed inside the system of this invention. Where an object instance is related to external data/information, the object details record will also contain, in one or more fields, a pointer to that external data/information.

It is obvious to one versed in the art that the data in a primary object details table may be duplicated in the object instance table, for speed of retrieval, albeit at the expense of increased storage.

It shall also be obvious to one versed in the art that, for speed of retrieval, there are multiple relational indexes or search indexes, both primary and composite secondary, created on the fields in the object instance table and the links table. Further such indexes can also be created on details tables.

In the preferred embodiment there is no hierarchy in which an object class has a subclass and so on, and all object instances of each object class are at the same level. However, it is obvious from the prior art that there can be separate structures or topological maps or networks held in network databases, or object hierarchies held in relational or network or hierarchical or object-oriented databases, that make explicit any actual hierarchies within the object instances, and that these hierarchies can provide additional ways of navigating the knowledge further to those permitted by this preferred embodiment.

In the preferred embodiment, there is a data dictionary holding descriptive data that is the basis of rules of linking, retrieval and display in respect of object instances and links, and the invoking or display of external data/information related to any object instances. The data dictionary is a collection of class descriptors.

A class descriptor, as schematically illustrated in FIG. 8, holds descriptive data in respect of one object class.

Firstly, the class descriptor in respect of one object class holds the names of the field or fields of the object details record that are displayed when the related object instance is selected (block 93 of FIG. 8). As is obvious to a person versed in the art, there may also optionally be rules that get or caused to be got further or other data for displaying from sources other than the system of this invention.

Secondly, the class descriptor in respect of one object class holds the names and locations of the external driver or drivers that are to be invoked when an object instance of said class is selected (block 94 of FIG. 8), along with the names of the field or fields in the object details record related to said object instance that constitute a pointer (block 95 of FIG. 8) to be presented to an external system or systems by means of said external drivers. As is obvious to one versed in the art, there can optionally be held further or different rules as to which drivers are to be invoked and what data is to be presented to them when a said object instance is deleted, added or otherwise manipulated by a user of the program of this invention.

Thirdly, the class descriptor in respect of one object class optionally holds (in the preferred embodiment, in a relational table that is related to the relational table holding the other data in the class descriptor) the definition of one or more dynamic views, shown in FIG. 8, that are used to determine the displayability of the object instances and links involving object instances of said object class. Each dynamic view holds (block 97 of FIG. 8) a list of ocid's of a subset of the available links classes that are permitted to be displayed when viewing the links involving one object instance of said object class through or using said dynamic view. Further, a dynamic view can hold an SQL statement (block 98 of FIG. 8) that must be satisfied as a precondition by matching on the object details record related to an object instance before that object instance can be displayed to the user when viewing through or using said dynamic view. As is obvious to one versed in the art, a dynamic view may also contain additional SQL statements or stored procedures or programs that look for matches on data outside the system of this invention.

Fourthly, the class descriptor in respect of one object class holds (in the preferred embodiment, in a separate relational table that is related to the relational table holding the other data in the class descriptor) the ocid's of those links which can involve an object instance of said object class (block 92 of FIG. 8). As is obvious to a person versed in the art, but is not indicated in said Figure, the class descriptor can optionally also hold secondary rules of linking, such as a program or SQL statement or stored procedure placing limits on how many links of one link class can involve a particular object instance, irrespective of how many other object instances are linked by said links, or whether any programs or stored procedures must be triggered and a particular satisfaction or parameter should be returned before a link of a given links class is made, or whether any specified program should be triggered upon the making of a link of a given links class.

The data dictionary, which is an amalgamation of class descriptors, holds data that is very small in volume in comparison with the other data inside the system of this invention. Therefore, a person versed in the art would know that the nature of how the data inside the data dictionary is structured is not particularly important, and that various implementations are feasible, including ASCII delimited strings or files to hold the information described above for the class descriptors, including dynamic views. The data dictionary is a collection of non-normalized relational tables in the preferred embodiment of this invention.

As is obvious to one versed in the art, the data dictionary is generally small enough for a copy of the whole or part of it, such a part being a collection of one or more class descriptors, to be delivered to and kept in a cache in the temporary or other fast memory of computer workstations, as opposed to having to be accessed repeatedly from a magnetic or other slower longer term storage of data. Further, a number of alternative schemes of cacheing the data dictionary or parts of it relevant to one or more object classes can be implemented to aid performance. In fact, in the preferred embodiment, the data dictionary also physically holds the primary Root details tables in order to minimize the need to go beyond the fast cache.

In the preferred embodiment, the said Roots details table is treated as part of the data dictionary for the purpose of cacheing and physical storage of tables. This is because the Roots details table is also organized by ocid of object classes and is small in size compared to the rest of the data in the system of this invention.

In addition, the system of this invention has means of presenting or displaying knowledge to a user, as well as receiving stimuli from the user, collectively such means being known in the prior art as a user interface.

Further, the system of this invention has means of sending and receiving instructions or any item of knowledge from an external system, collectively such means being known in the prior art as inter-process communications.

The object instance table, the links table, the primary object details tables and the data dictionary between them hold all the data necessary to be searched, retrieved, displayed for the purposes of navigation, updated and added during the vast majority of steps of navigation of the knowledge, as well as creation of further relationships within the knowledge during said navigation.

The system of this invention permits navigation between items of knowledge of different types from the same or different sources. The system of this invention, in effect, holds pointers or references to these items of knowledge and also the meaningful relationships and navigation paths between these pointers.

Where the knowledge involves external data/information, the system of this invention needs firstly outward communications means to instruct an external system to display or return the requisite data/information referenced by a pointer. Secondly, when a user has, using means other than the present invention, caused to be displayed or otherwise made current ("selected") in that external system a particular item of external data/information for which a corresponding pointer exists in the system of this invention, then the system of this invention needs inward communications means to receive instructions to display or otherwise make current the said pointer, which process is known as synchronizing the external system with the system of this invention.

It is obvious to one versed in the art that for an external system to be so involved, it is necessary to have programmatic communications means that can achieve said communication between the system of this invention and that external system. Further, said communications means can differ from one external system to another and that there are numerous prior art ways of providing the means which are not the subject of this invention. These communications means in respect of one particular external system are effected or implemented inside the external driver or drivers that are identified inside and locatable from the class descriptor of a designated or associated object class. Each driver also needs to have programmed inside it the ability to hold and communicate to the system of this invention the ocid of the object class to which a relevant item of external data/information selected inside the external system is uniquely related. If there are different types of items of data/information in a particular external system, the driver may need to identify which type of item is selected and then identify the corresponding ocid.

Where one particular external system has items of data/information of sufficiently different types or character, it may be necessary for that system to be associated with more than one designated object class, with object instances of each such object class being related only to external items of data/information in said external system that are of one particular character or type. The relationship between an item of data/information in said external system and an object instance is said to exist when the object details record of said object instance holds a pointer uniquely capable of identifying said item. As such, the external driver or drivers need to create the said object instance and object details record, populating the latter with the relevant pointer, for each said external item of data/information. As is obvious to one versed in the art, the said object instance and object details record may be created only when a user so decides in respect of an external item of data/information, including as an initial step when a user wishes to create a link involving said external item.

Some of the links in the links table can result from a manual or programmatic identification of one or more types of relationships between items of external data/information objects, including documents, held in external systems. For example, a relationship can be identified on the basis of identity of value in foreign keys of two database records in said external systems, foreign keys being database fields that between them completely and uniquely identify a record. In another example, such a relationship can be identified on the basis of a manual or programmatic analysis of the content of the text or multimedia content of two documents or multimedia objects showing that a certain identical concept occurs in or is signified by both the objects. For a link between two items of external data/information to be made or represented through the system of this invention, firstly, each of said two items must be related to an object instance, secondly, a link (along with its corresponding object instance) must be created linking both these object instances.

Figure 16:
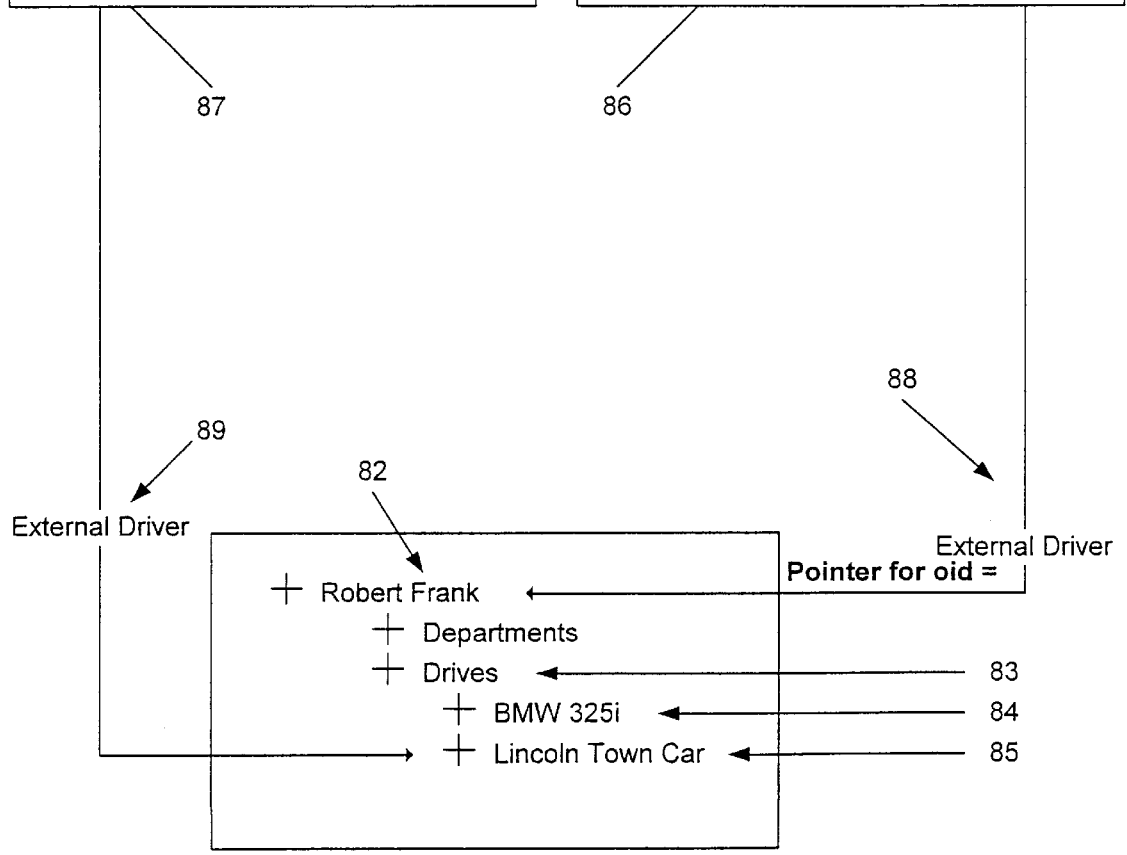
FIG. 16 shows a schematic interaction between the system of this invention and items of data/information in two systems not of this invention.

When a user, or some external programmatic means, selects or makes current a particular object instance related to a pointer to an item of external data/information, the external driver or drivers referred to by the class descriptor of the object class to which said object instance belongs are activated and the pointer held in the object details record related to said object instance is presented to said driver or drivers, which causes the appropriate external system to bring up, display or otherwise return the values of the said item of external data/information, as schematically illustrated in FIG. 16. It is prior art to so go from a pointer in one system to the item of external data/information identified by the pointer; the ways to achieve this differ from external system to external system, and numerous programmatic prior art means exist. By such prior art means, the present invention is able to navigate to specific items of external data/information.

It is prior art to hold pointers or references, as well as drivers, to items of external data/information in databases separate from an external system, albeit, as shall be seen below, subject to many limitations that this invention overcomes. However, the prior art does not disclose the synchronizing of external systems with a single or unified database holding the pointers and relationships. This synchronization permits a user to start from an item of data/information in one external system, from there go to the related object instance, as illustrated schematically in FIG. 16, and further follow links to go to an item in another external system, thence to a third external system and, perhaps, back to another or even the said starting data/information item in the first external system, all by following links held within the system of this invention and then selecting appropriate object instances. It is obvious to one versed in the art that the synchronizing capability may be extended to automatically bring up some or all items of external data/information linked to the current or selected item of external data/information, without the need manually to follow links and select object instances.

Said synchronization is partly made possible by this invention overcoming the limitations of prior art by eliminating multiple places where pointers and relationships are held and providing for the unification in one database and mechanism of all pointers to and relationships between items of data/information, irrespective of the system in which the items are held. Further, this invention provides for scaleability of this unified database and mechanism in that it is capable of accommodating pointers to relationships involving items from new external systems, without a limit on the number of new external systems being introduced and with low impact on the complexity of said unified database and mechanism.

While the navigation between different systems has its benefits in principle, it can only be used regularly for real purposes if the total time taken to synchronize, i.e. to go from a particular data/information item in one external system to the related pointer in the system of this invention, and then to see the other linked pointers or intermediate relationships and object instances leading up to a desired pointer, is very short. As shall be seen below, the system of this invention is optimized to allow linked object instances to be seen and navigated between via links or relationships.

Further, it is necessary that external items of data/information, even if they are documents or media objects, are not treated as end points or leaf nodes during navigation and that it is possible on arriving at or having displayed said external items to continue to navigate to links other than the one from which the external item was reached. Prior art systems that use hierarchical or cross-referenced navigation need to have such end points and leaf nodes, particularly in the case of document and media objects, and the only further navigation, if any, available to the user is to return along a reverse-direction counterpart of the link by which the document or media object or other end point or leaf node was reached. This unbroken navigation has the effect of letting users choose any of the external systems as a starting point, rather than being restricted to pointers or data/information items held within the system of this invention, without worrying about restrictions on where they can navigate to from that external system. When users choose an external system as a starting point, they are able to take advantage of that system's user interface, security and special functionality for finding the starting point, rather than being faced with a new user interface for those purposes.

The combination of holding pointers to and relationships or classified links between items of data/information, including items of data/information in external systems, in a unified and scaleable manner that permits the inclusion at any time of items of data/information from new external systems, providing fast navigation along one or more types of links or relationships between the pointers, synchronizing between external systems and pointers to items of data/information in those external systems, and having unbroken navigation free or optionally free of end points or leaf nodes, is a novelty of this invention. As a manifestation of this novelty, the user of the system of this invention is able to have unbroken continuous paths of navigation between more than external system along meaningful links, whether starting from the system of this invention or starting from within an external system. It is obvious to one versed in the art that the system of the present invention is applicable as a general way of integrating and providing navigation between data/information in multiple external systems without significantly changing the user interface of any of the external systems or requiring a significant proportion of the functionality of the external system to be reproduced in the means of integration.

In one preferred embodiment, all the data held inside the object instance table and the link table are presented to the user on a computer screen in the form of an apparent hierarchy of folders, with the difference that this hierarchy is endless and not a strict or real hierarchy, and that an item of knowledge can appear at as many levels of the apparent hierarchy as meaningful. The endless hierarchy is illustrated in FIG. 9, displaying part of the illustrative data held inside the object instance table (FIG. 2), the links table (FIG. 3) and the primary object details tables shown in FIG. 4, FIG. 5, FIG. 6 and FIG. 7.

Figure 9:
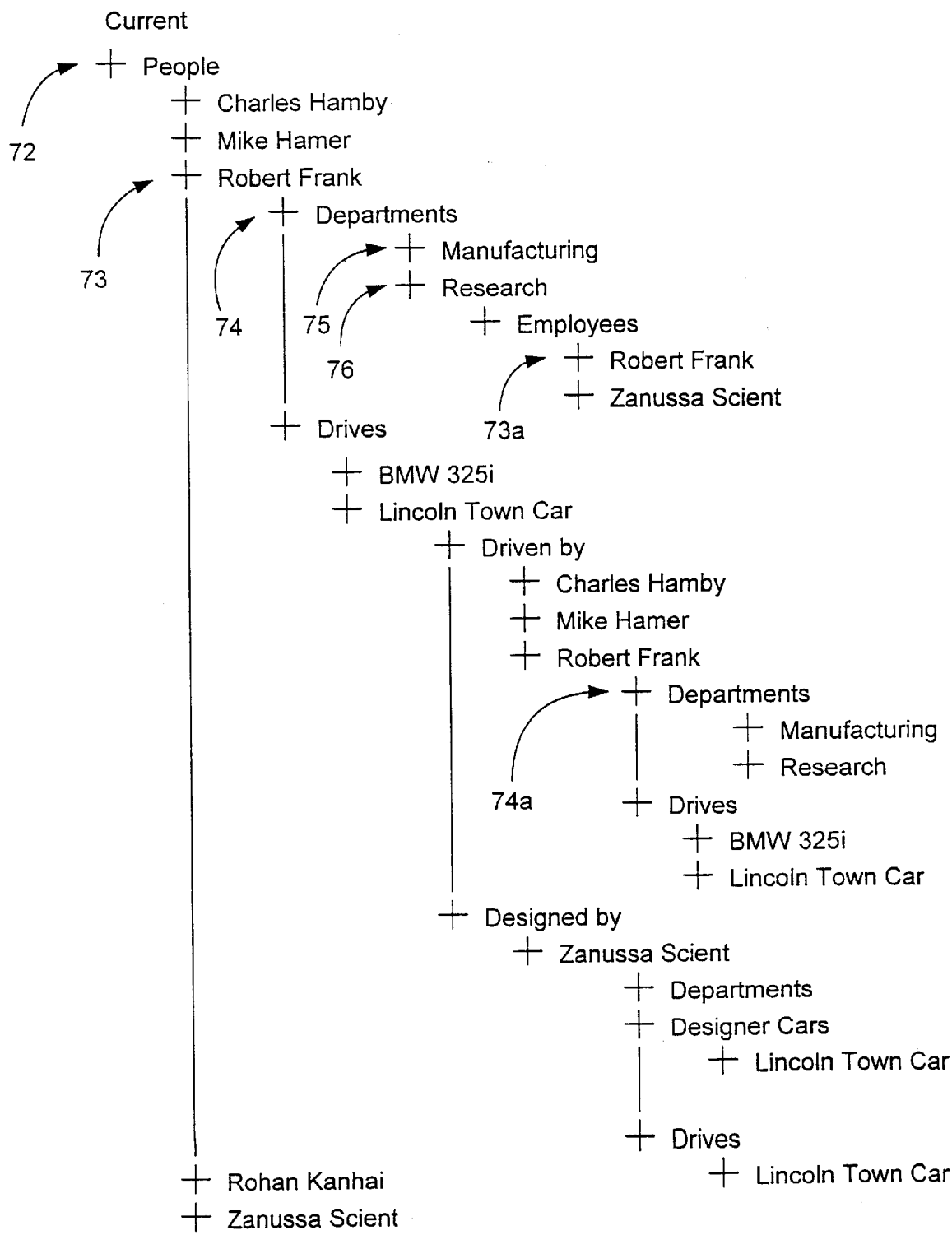
FIG. 9 shows how the illustrative data in the object instance table, the links table and the details tables can be visualized as an endless hierarchy.

As seen in FIG. 9, the person Robert Frank appears at multiple places, including blocks 73 and 73a. Opening the folder for Robert Frank always shows the folders for links classes of links starting from Robert Frank. As such, the links class folder Departments always appears under Robert Frank, as seen in blocks 74 and 74a. This illustrates the general principle of such an endless hierarchy.

In any endless hierarchy displayed in said preferred embodiment, a folder is one of (a) a collection of object instances of one object class, as in block 72 of FIG. 9; (b) where the parent folder is a said collection, an object instance of the same object class, as in block 73 of FIG. 9; (c) where the parent folder is an object instance, a collection of links of one class in which each link has that object instance as one of two object instances linked, as in block 74 of FIG. 9; (d) where the parent folder is the said collection of links, one of the said linked object instances other than the object instance that is the parent as aforesaid, as in blocks 75 and 76 of FIG. 9.

The said four types of folders may be thought of as falling in one of two categories, namely, (a) and (c) which are collections containing many items of the same class (collection folders), and (b) and (d) which are object instances (instance folders). There are, from a user interface point of view, effectively, only three actions needed from the user to navigate along any possible path: firstly, selecting and opening a collection folder; secondly, selecting and opening an instance folder; and thirdly, selecting to see the item of data/information, including external data/information, associated with an instance folder. This is a minimized domain of the variance of actions that a user has to take for the vast majority of navigations through diverse forms of inter-linked knowledge.

Figure 10:
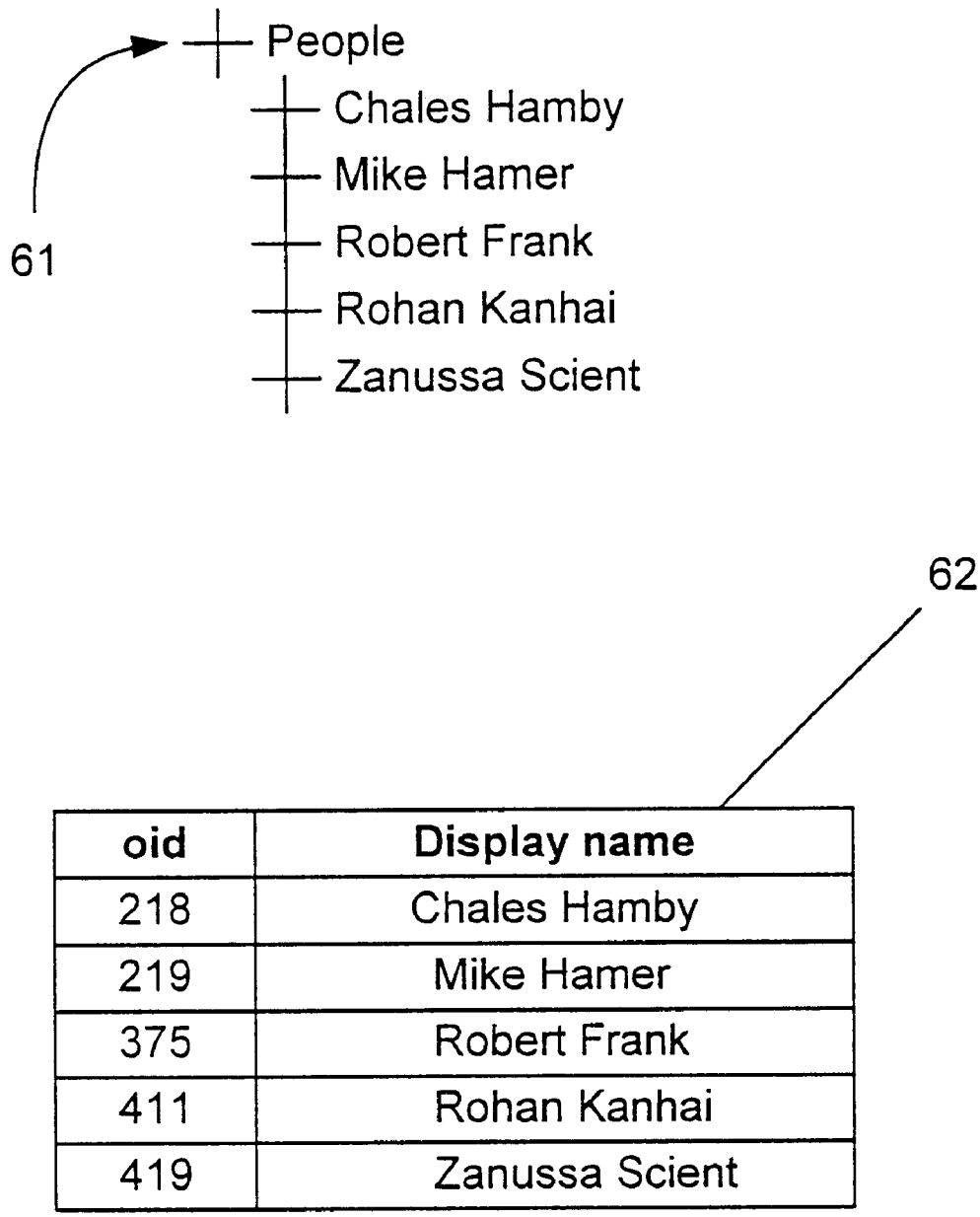
FIG. 10 shows the query results for the opening of the folder for an object class.
Figure 11:
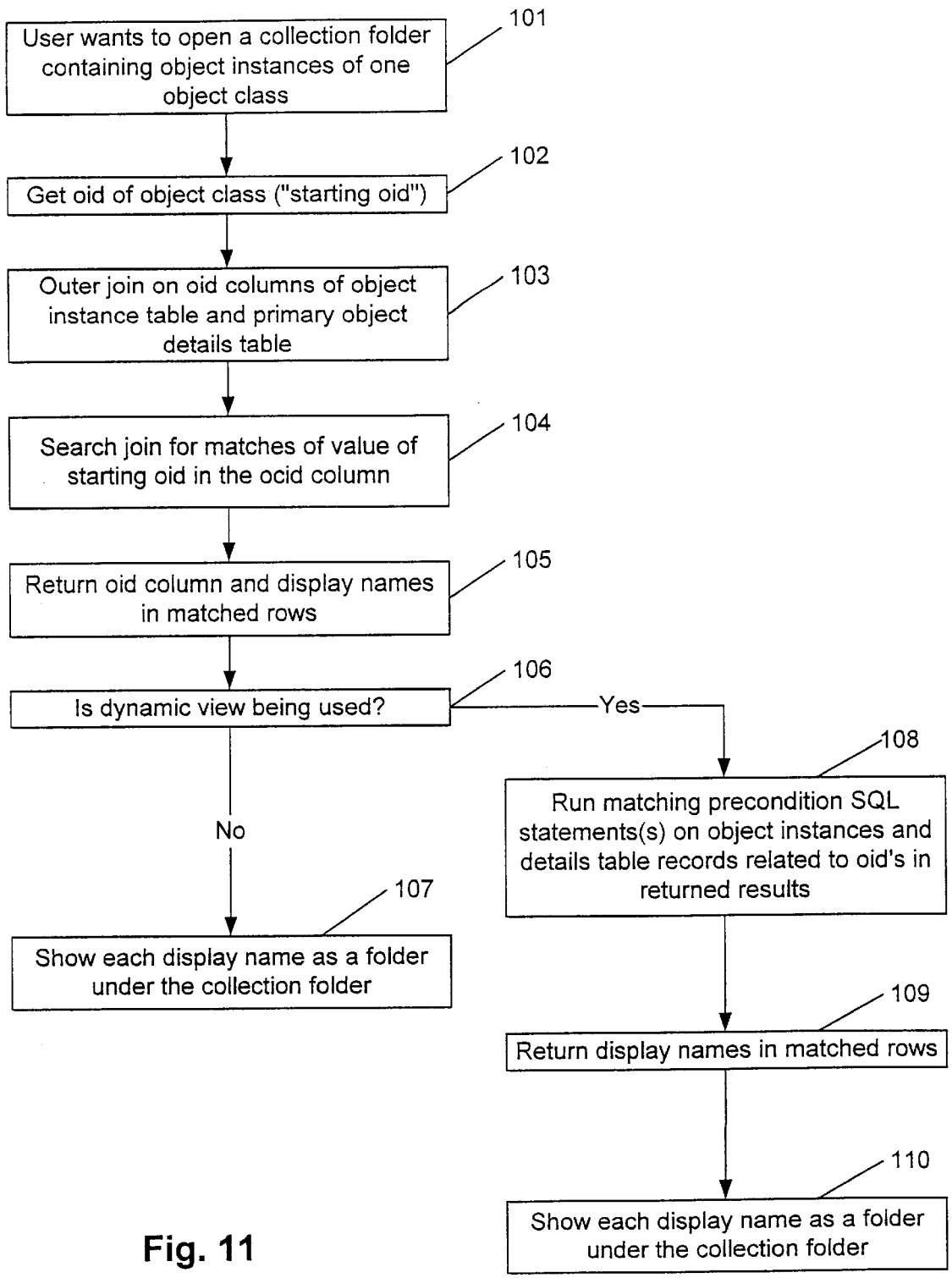
FIG. 11 is a flowchart for the processing for the opening of the folder for an object class.

First, we will explain the processing when it is necessary to open a collection folder containing object instances of one object class. This is illustrated in FIG. 10, where the user selects the folder for the People class, block 61. For a flowchart of the sequence of steps, see FIG. 11 simultaneously. The oid of the starting object class (the starting oid), integer 13, is known at the outset (see block 101 in FIG. 11) by virtue of the display name "People" being related to the oid 13 in the primary Root details table, as seen from blocks 37 and 40 in FIG. 4. When the user opens or expands the People object class folder, a SQL query is made (block 103) on an outer join on the oid columns of the object instance table (FIG. 2) and the primary object details table of the People class (FIG. 5) searching (block 104) for matches of the starting oid (integer 13) in the ocid column (block 31 of FIG. 2). The oid's and the corresponding display names (block 43 of FIG. 5) columns of the query results are returned (block 62 of FIG. 10)—see block 105. The display names are displayed (block 107) as folders one level of hierarchy lower than the said folder for the People class, as shown in FIG. 10.

If the user is using a dynamic view to view the People object class (block 106), then the said processing has additional steps before the query results are displayed. Any SQL statement or statements held in the dynamic view as a matching precondition of displaying of object instances are executed (block 108) on an outer join of the said query results and the primary and any secondary object details tables for People object class, the result giving display names of only those object instances for which said SQL statements are satisfied (block 109). As is obvious to one versed in the art, said matching preconditions may be satisfied by expanding or performing in alternative ways the said step of joining the object instance table with the primary object details table and searching in said join. Also, different joining and searching strategies may be necessary where the matching precondition involves matching on data beyond that held in the system of this invention. As is further obvious to one versed in the art, the necessary queries can be performed in a number of ways and orders, optimizing the processing according to the type of relational database engine being used in the preferred embodiment and also the volume and density of the data.

Where there is no dynamic view involved or there is one that does not require any searching on any data outside the primary object details table, only a single query need be performed on the object instance table joined with the primary object details table. The join involved is efficient as the relationship on oid between object instance and the relevant object details tables is one to one.

The query searches in the joined relational view for matches of the said oid in the oid column as well as matches of the match criteria in the columns coming from the primary object details table. The query returns the oid's and display data, which are then displayed as folders below the said collection folder being opened. As is obvious to one versed in the art, if the currently used dynamic view requires searching and matching on any data outside the primary object details table, then the querying is more complex and has to be determined according to the matching criteria.

Figure 12:
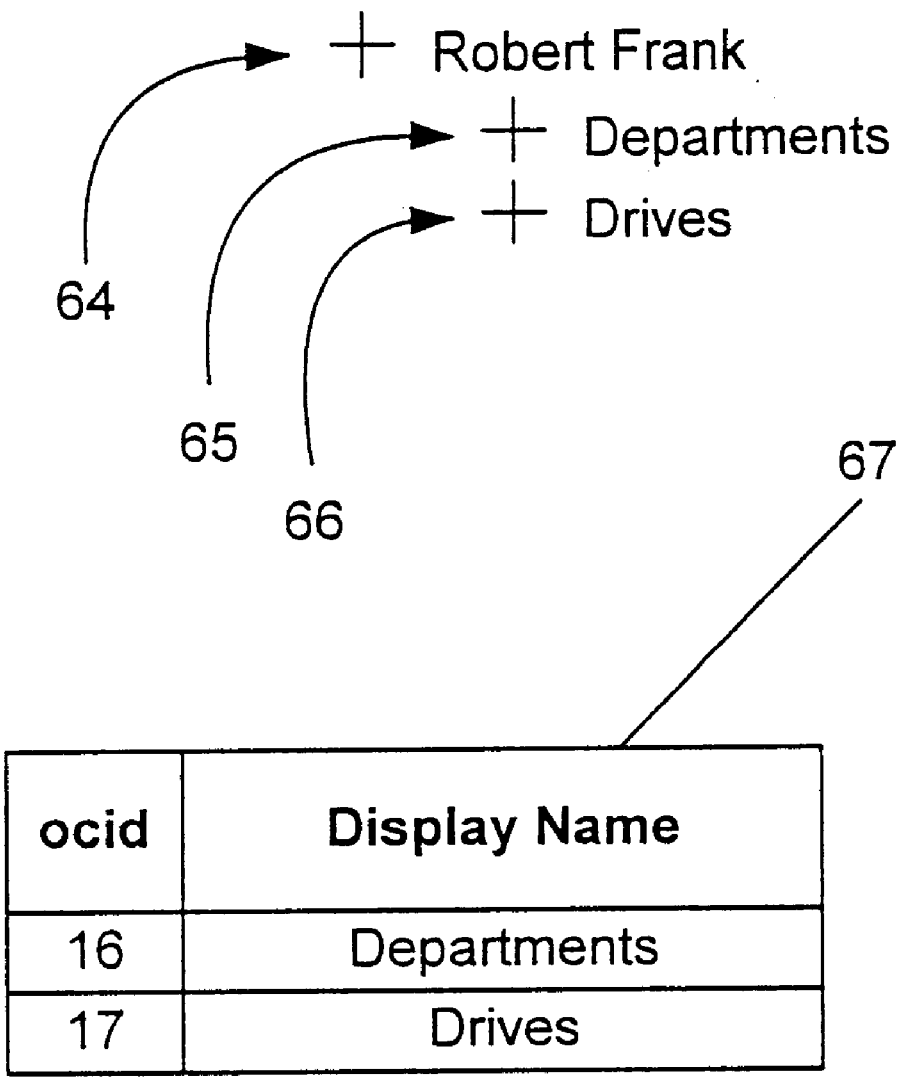
FIG. 12 shows the query results for the opening of the folder for an object instance.
Figure 13:
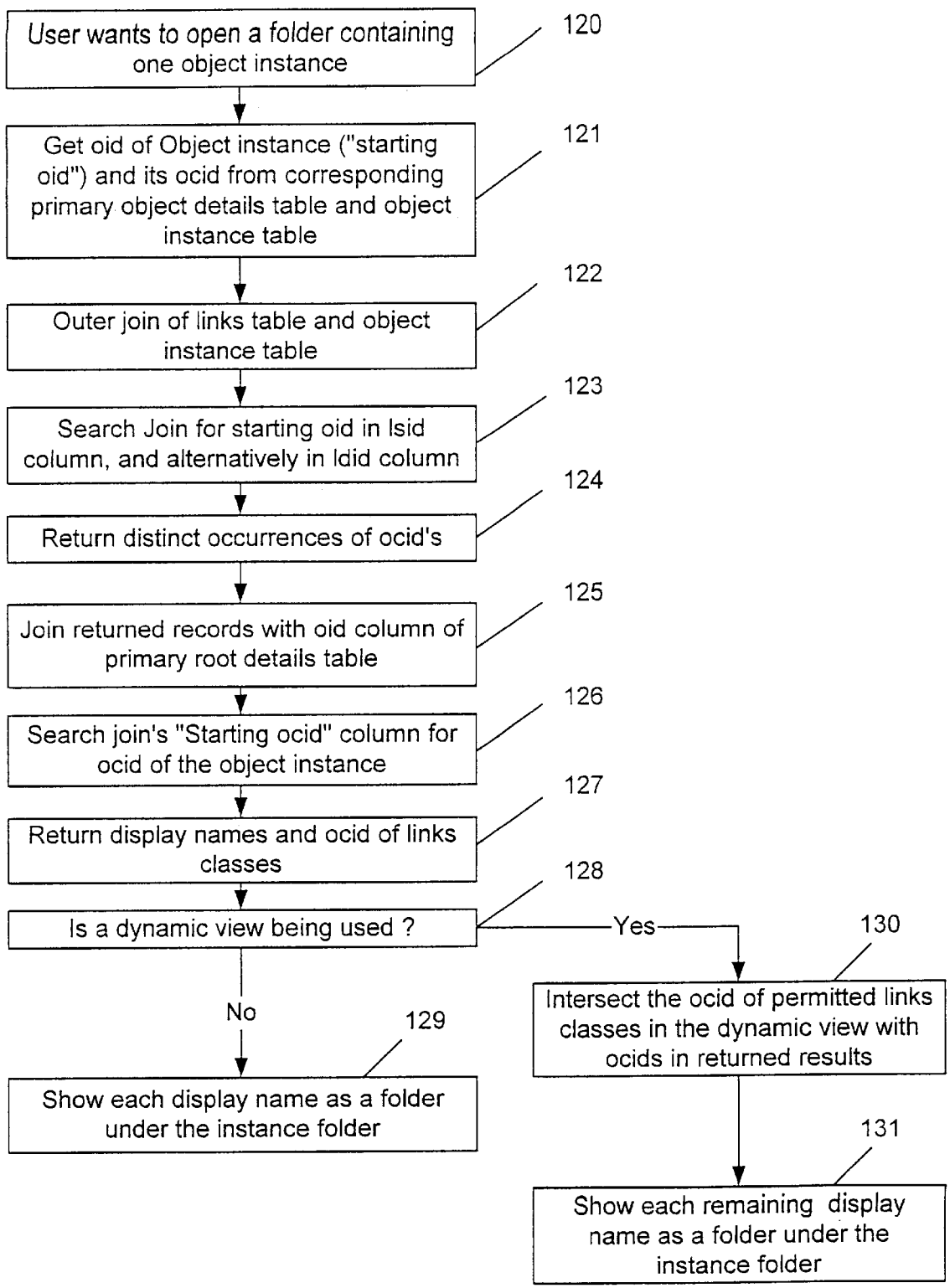
FIG. 13 is a flowchart for the processing for the opening of the folder for an object instance.

Next, we will explain the processing required in the preferred embodiment of this invention when the user is at an instance folder, i.e. has selected an object instance (the starting object instance), and opens that instance folder to reveal underneath the various collection folders representing collections of the various classes of links involving the instance object. We will illustrate the processing in the preferred embodiment by means of FIG. 12, where the user selects and opens the folder for the person Robert Frank (block 64). The flowchart in FIG. 13 should be seen simultaneously to follow the sequence of steps. The oid of Robert Frank (the starting oid, integer 375) is known at the outset from the primary object details table for the People class (FIG. 5, display name is block 43). The ocid, integer 13, of Robert Frank is also known from the object instance table through said oid, block 31 of FIG. 2—see block 121 of FIG. 13. A query is performed on an outer join of the links table and the object instance table, with the foreign keys being the oid column in the object instance table (block 30 of FIG. 2) and the lid column in the links table (block 34 of FIG. 3)—see block 122. The query searches (block 123) for matches of the value of the said starting oid (integer 375) in the lsid (block 35 of FIG. 3) and alternatively in the ldid (block 36 of FIG. 3) columns of the links table. The query returns (block 124) in the result only distinct occurrences of the ocid's. The returned records are then joined (block 125) with the oid column of the Root details table (block 37 of FIG. 4), and a search (block 126) is made in the Starting ocid column (block 39 of FIG. 4) for the said starting ocid of Robert Frank. The Display name column (block 40 FIG. 4) of the resulting records gives the display names in the appropriate direction of the links classes for which links to the starting object instance actually exist—block 127. The said display names are then displayed (block 129) as folders at a next level of hierarchy below the said opened instance folder.

If the user is using a dynamic view to view the object class of the said starting instance folder, i.e. the People object class, then the said processing has an additional step before the query results are displayed (block 128). The ocid's of permitted links classes are intersected with the ocid's in the said query results to eliminate any link classes not permitted to be displayed through said dynamic view (block 130). As is obvious to one versed in the art, the necessary queries can be performed in a number of ways and orders, optimizing the processing according to the type of relational database engine being used in the preferred embodiment and also the volume and density of the data. These queries alone, of which some involve searching a relatively very small amount of data, are sufficient to produce all the information to display the branches below the said opened folder. In this way the possible classes of links for which there are no actual links involving the said object instance are eliminated, as are those which are not permitted to be displayed by the current dynamic view being used for display (block 131).

It is obvious to one versed in the art that rather than having to query the object instance and links tables separately, it is possible to repeat the value of the ocid's of the links classes in the links table itself. However, the preferred embodiment of this invention saves on space by having this value only in the object instance table and relies on the fact that the query on a relationally joined view is highly efficient as there is a one to one relationship between the lid and oid of the object instance corresponding to a link.

It is also obvious to one versed in the art that if there are generally only a small number of possible link classes, and it is not necessary to be concerned about selectively hiding some links from some users, there is the option of drastically further reducing the said processing by omitting the searching of the object instance table and links table, simply finding the display names of all links classes that can potentially be displayed below the said starting instance folder, by searching for the starting ocid in the Starting ocid column of the Root details table. Alternatively, a join of the dynamic view and the Root details table can be so searched to eliminate any link classes not permitted to be displayed, but eliminating the much larger amount of processing needed to eliminate those links classes for which no link involving the starting instance folder actually exists.

Figure 14:
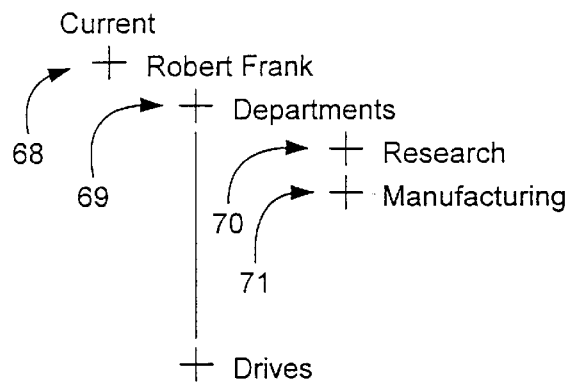
FIG. 14 shows the query results for the opening of the folder for a collection of links of one type linked to a single object instance.
Figure 15:
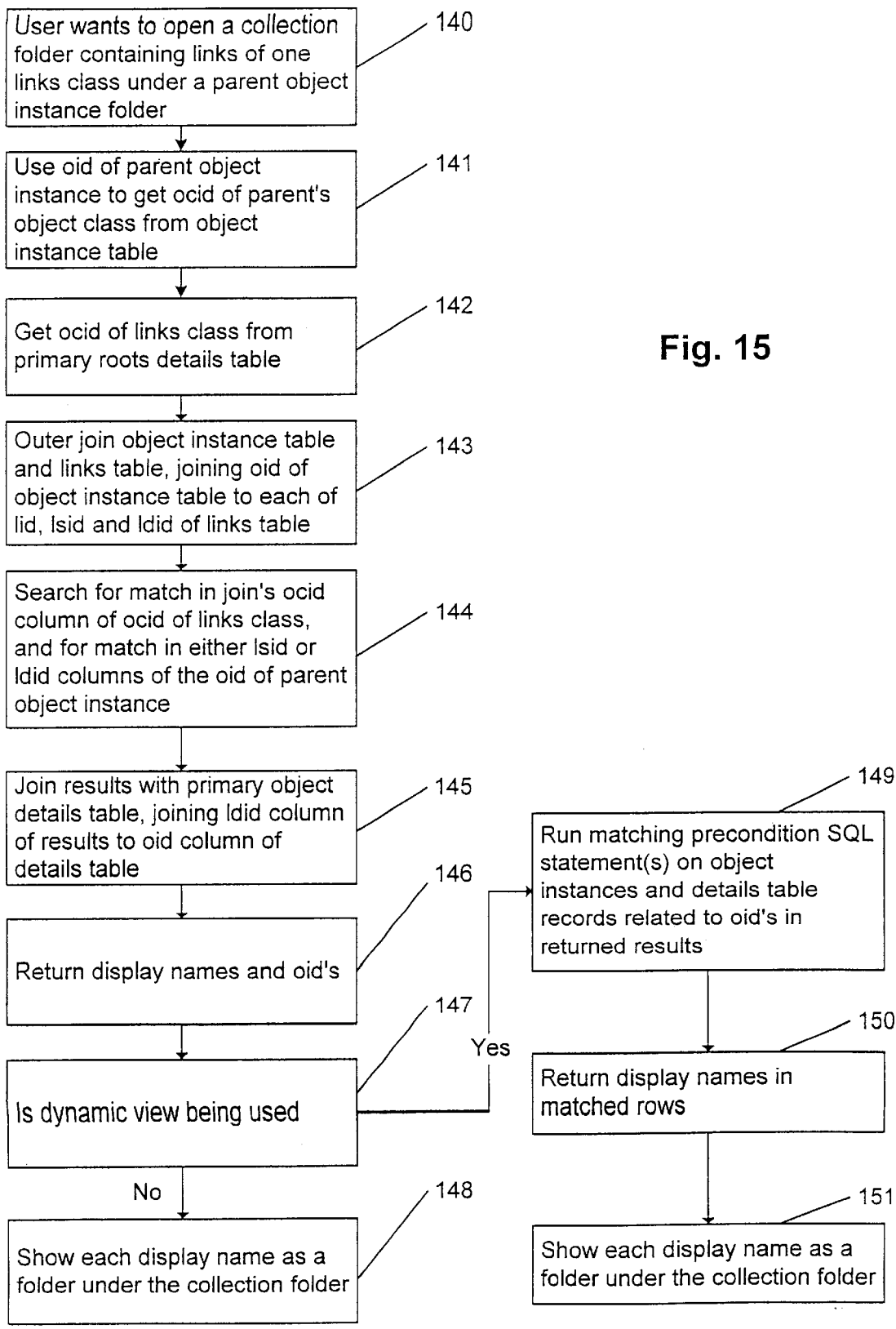
FIG. 15 is a flowchart for the processing for the opening of the folder for a collection of links of one type linked to a single object instance.

Next, we will explain the processing when it is necessary to open a collection folder containing links of one links class where a single object instance (the parent of the said collection folder) occurs as one of the object instances linked by each said link, illustrating it with FIG. 14, where block 68 (Robert Frank) is the said parent folder and block 69 (Departments) is the said collection folder. The flowchart in FIG. 15 should be seen simultaneously to follow the sequence of steps. In the illustration the user selects and opens the said collection folder. The oid of the said parent folder is known at the outset (integer 375, as explained above for Robert Frank), from which, through the object instance table's ocid column, the ocid of Robert Frank is known as integer 13—see block 141 of FIG. 15. Further, also known at the outset (block 142) is the ocid of the links class of the said collection folder (from the ocid value of the Root class's details table—FIG. 4—matching integer 13, and the display name matching "Department"). On opening said collection folder, it is necessary to display the other object instances linked by the said links contained in said collection folder, i.e. other than the said parent. The processing involves working with an outer join of the object instance table (FIG. 2) and the links table (FIG. 3) where the oid of the object instance table is joined to each of the lid, lsid and ldid columns of the links table—block 143. The said join is queried (block 144), searching for records where the ocid column (block 31) matches the ocid value (integer 13) of said links class, and the either the lsid (block 35) or ldid (block 36) columns matches the oid (value integer 375) of said parent, returning all matched records which contain oid's of all the said other object instances. The returned results are joined (block 145) with the primary details table of the object class to which the said other object instances belong (i.e. the primary details table of the People class, FIG. 5), joining the ldid column to the oid column of said details table, returning (block 146) the oid's and display names (block 43) of said other object instances. These are displayed (block 148) as folders in the hierarchy underneath the said collection folder, thereby showing the destinations of the links in the collection folder. If a dynamic view is being used at the time, further processing (block 149 to 151) is as for processing for the dynamic view described above in the case of opening a folder for an object instance.

The endless hierarchy view of FIG. 9 is obtained by the user combining the above described steps of selecting and opening collection and instance folders in various paths, starting from the collection folder for the People class, and carrying out the processing for opening folders described above.

By reducing to a minimal set the actions required to traverse the endless hierarchy, and thereby navigating all the knowledge held in the system of this invention, it has thus been possible to optimize the system of this invention for fast navigation of knowledge. The time to perform any single step of navigation grows for practical purposes roughly linearly with the volume of data, irrespective of the number of classes of information and the density of links between instances of object classes.

The first important benefit of the above described way of organizing data and its presentation is that everything necessary to visualize and determine the path of navigation of knowledge is presented to the user in a virtually identical manner. The second important benefit is that all chains of relationships, including those that lead back to a starting point, can be followed and reached merely by continuing to expand one or another of the folders. The third important benefit is that each immediately available next step of navigation within the endless hierarchy requires one of only two necessary kinds of actions from the user, and the processing time is minimized and is also made broadly predictable and consistent across steps so that the user is able to continue navigating without uncertainties as to the time taken to perform the next step.

In a second preferred embodiment, the said data are presented to the user in the form of pages or documents displayed on a computer screen with hyperlinks visible inside the pages or documents to jump between pages or documents. Each hyperlink is the equivalent of one of the folders in the endless hierarchical presentation above. Each jump via a hyperlink is the equivalent of expanding a folder. It is obvious to one versed in the art that, given that it is possible to combine just two types of actions or steps to achieve any length of navigation using the system of this invention, alternative uniform presentations are possible, including via voice communication.

Figure 17:
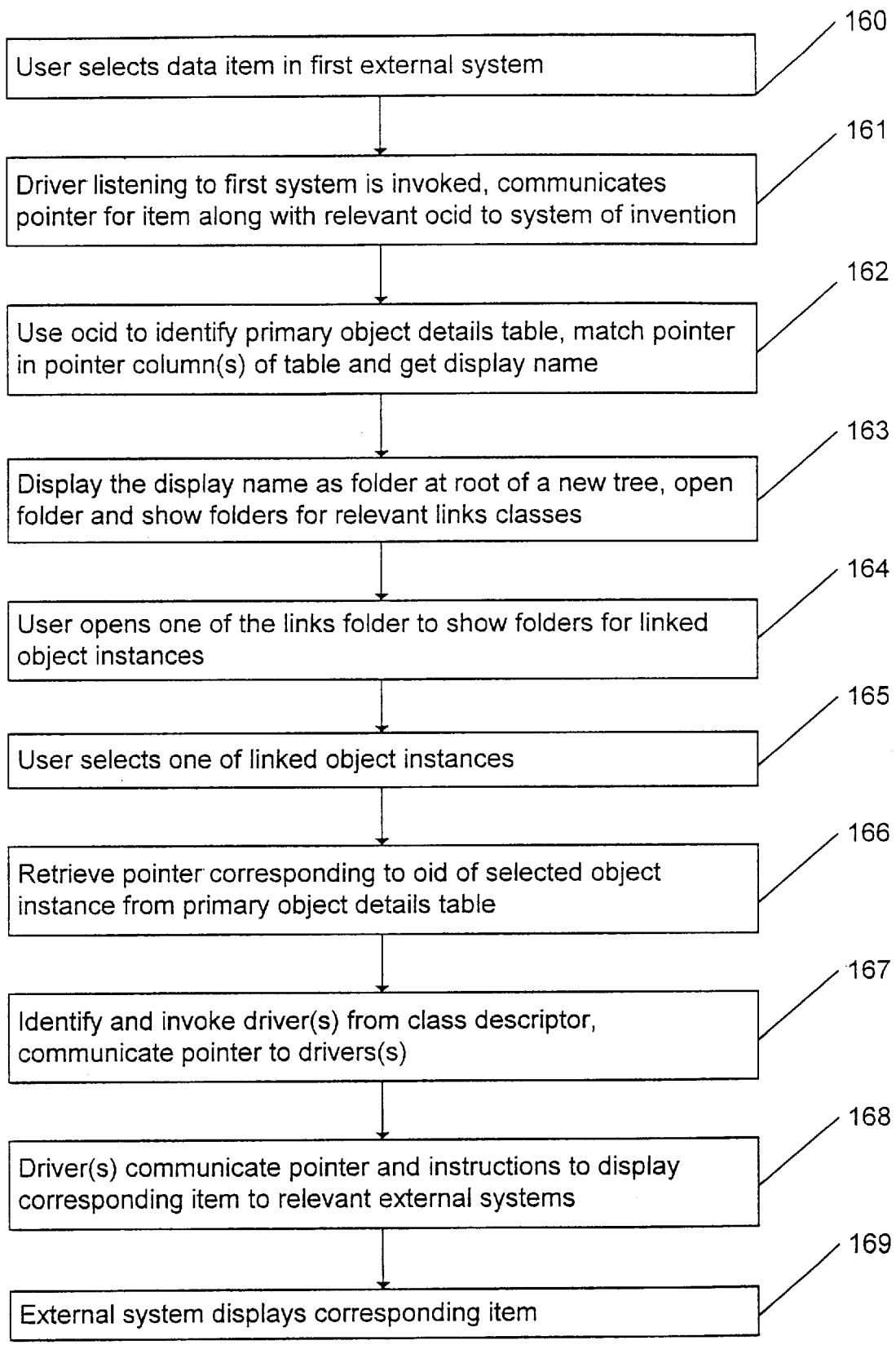
FIG. 17 is a flowchart for interaction between the system of this invention and items of data/information in two systems not of this invention.

We will now explain the processing when a user selects an object instance that is related to an item of external data/information. This is illustrated through the schematic in FIG. 16. The flowchart in FIG. 17 should be seen simultaneously to follow the sequence of steps. When the user selects (block 160 of FIG. 17) the record for Robert Frank in the external system at block 86 (typically a Personnel Manager System or a Contact Manager), the external driver at block 88 is invoked and is given the pointer for Robert Frank, which the driver communicates to the system of this invention—block 161. The said external driver holds the ocid of the object class to which object instances associated with the said item belong (here it is the People class, ocid is integer 13), the driver also communicates the ocid to the system of this invention. The ocid enables the system of this invention to identify the relevant class descriptor in the data dictionary (FIG. 8), as such the associated primary object instance table of the object class is identified—block 162. This match for the said pointer is searched for in the pointer column in the object details table of the People class (block 44 of FIG. 5), from which the oid and display name of Robert Frank are found (block 42). The system of this invention thereupon displays (block 163) the folder (block 82 of FIG. 16) representing Robert Frank. Below this folder, the system displays the folders for the links classes of links involving Robert Frank, using the folder-opening processing already described. This is the principal part of the processing needed to synchronize the system of this invention with an external system. The user can then open folders further (block 164), using the folder-opening processing described above, and causes other information to be displayed, in particular the cars driven by Robert Frank. As is obvious to one versed in the art, the said external driver can be given functionality to insert a corresponding object instance and related object details record with the pointer as a value if the pointer does not already exist. Similarly, deletion of an external item of data/information related to a pointer held in the system of this invention which is deleted by a user of said system can be handled by processing in the external driver.

Using the illustration data in the object instance table, links table and the Root details table, and processing for opening an instance folder, the folder for the Drives link (block 83) is one of the folders displayed under the folder for Robert Frank. Further opening (block 164) said Drives folder displays, by means of the folder opening processing described above for collection folders containing links, and using the data in the said tables, displays the folders for BMW 325i (block 84) and Lincoln Town Car (block 85). When the user selects (block 165) the said folder for Lincoln Town Car, the pointer for the object instance related to Lincoln Town Car (oid 522, as obtained from block 48 of FIG. 7) is retrieved (block 166) from the pointers column of the object details table (block 50 of FIG. 7) for the object class Cars to which said object instance belongs. This pointer is communicated (block 167) to the external driver or drivers identified by the class descriptor of said object class, which in turn causes (block 168) the external system (typically a car inventory system) holding the external item of data/information related to said pointer (block 87 of FIG. 16) to display the item for Lincoln Town Car—block 169. The combination of this processing along with the said processing for synchronizing an external system with the system of this invention and the said processing involved in opening folders provides the user the ability to go from one item of data/information in one external system to another external item in the same or another external system.

It will be obvious to one versed in the art that it is necessary for any external system so participating in linking to send an event or trigger to one or more relevant external drivers. The external drivers need to identify themselves in a unique manner (allowing the system of this invention to identify the associated object class' ocid). Once ocid is known, the relevant object details table or tables are known, and the pointer can thus be determined, returning the oid and display data for the object instance. The user can then navigate along the endless folder hierarchy to see linked object instances and, as appropriate, see other related items of external data/information.

It is also obvious to one versed in the art that a said external driver can further be given the functionality to programmatically instruct the system of this invention to open and navigate to any folder further below in the said hierarchy and then cause to be invoked the relevant external driver or drivers related to said folder, thereby automatically displaying or otherwise selecting or making current the item of external data/information related to said folder. Thereby, the system of this invention can be made to give direct navigation between two systems not of this invention, or between two different items of external data/information inside one system not of this invention, without the need for a user directly to instruct the system of this invention.

It is a novelty of this invention to provide a maximized domain of uniformity or lack of variance of the actions required from the user for navigating, the consistency of presentation being there irrespective of where the user is during navigating, and the speed of navigation between items of data/information from the system of this invention and, where required, from one or more external systems.

Many links in the links table are the result of the addition of further various types of knowledge by users of the knowledge held by or accessed through the present invention. This kind of knowledge is termed usage-created knowledge. It is possible for users of knowledge, especially those working together in teams, to add a whole range of types of further knowledge, including what may be termed usage-created relationships and metadata, that results from the usage of the knowledge accessible by the present invention. All this added knowledge is treated, i.e. stored, retrieved and displayed, identically to the existing knowledge and becomes part of the entire body of knowledge.

The invention allows the creation, accessing and display of usage-created relationships and metadata such as are necessary for users to achieve, among other things obvious to a person versed in the art, the following:

- ad hoc or assessment-based linking of objects of the same or dissimilar classes, thereby referencing data/information from one or more systems, for particular purposes or to ensure that certain things which are not already linked are seen together by user making the links or colleagues
- adding new instances of any object class pre-defined in the data dictionary up to that time, for example new documents or electronic mail, and linking them to other objects as permitted by any pre-defined rules of relationships
- holding discussions and exchanges, being threads of comments and responses thereto, that refer to one or more other object instances
- manually indicating which user has seen which items of knowledge and in the context of which other object instances,
- where such programmatic means are specifically created and added, in ways obvious to one versed in the art, automatically tracking and recording which user has seen which items of knowledge and in the context of which other object instances,
- to classify or enrich knowledge by means of making links to an object instance that does not yet exist, including an object instance that serves as part of a pointer to an item of external data/information to which no pointer currently exists adding field values for detailed data related to any object instance In the preferred embodiment of this invention, the necessary input from the user for addition of knowledge is achieved by identifying an object instance in the endless hierarchy display, or a hyperlink in the hyperlinked display, then a combination of context-sensitve menus, including selecting one from the types of links available to link two object instances, and filling of forms. Where the addition of knowledge involves a pointer to an item of external data/ information for which no pointer currently exists, that step is achieved by dragging with the mouse and dropping onto the relevant tree node of the said item, or by a combination of menus and filling of a form. As is obvious to one versed in the art, this input can take place in a number of alternative ways, including invoking of programmatic means external to the system of this invention.

At any point in time, all the types of new usage-created relationships and metadata are stored and organized entirely through the creation of object instances of classes preexisting the new relationships and metadata, links of classes pre-existing the new relationships and metadata, and, where required, records in pre-existing details tables. As such, all the operations of navigation and presentation are available to these new usagecreated relationships and metadata. Further, after creation, said usage-created relationships and metadata become available for yet further usage-created relationships and metadata to be created about or involving them.

In this way, the system of this invention provides a homogeneous way of incrementally adding and then using diverse types of knowledge about all existing knowledge, whether held inside the system of this invention or in external systems.

It is a novelty of this invention that it enables users to add, or programmatically cause to be automatically tracked and added, a maximized domain of variety of new knowledge of types that are meaningful to be added during usage of existing knowledge, and then allows this additional knowledge to become integrally intermixed with and be treated identically to existing knowledge.

When further combined with the said synchronization capability and the ability to invoke external drivers on selection of object instances related to pointers, it becomes a further novelty of the system of this invention that it permits the addition of knowledge about items of data/ information in two different external systems where neither external system is designed or capable itself of holding that knowledge, and yet the user of one of these external system can navigate this knowledge as effectively as if the knowledge were held in the said external system.

The usage-created knowledge is meant to be seen by users during navigation. But, it is also meant to serve another purpose, namely, guide users towards or away from certain items of data/information. The basis of said guidance is how the user thinks his own actions should be determined or influenced by factors such as which items have been previously seen by the current user or by specified colleagues, and what kinds of links were added as part of usage-created knowledge and when. For the system of this invention to help the user determine actions as aforesaid, the system needs to be able to take instructions from the user as to what should be sought for or queried in links and other usage-created knowledge and, as a result of the query, which object instances should be specially brought to the user's attention, or be hidden from view.

The system of this invention allows the use of a selected said dynamic view to view object instances and links involving object instances of an object class. The processing involved in viewing through a dynamic view has been described above. The dynamic views are treated as virtual or surrogate object classes by being placed in the Root details table, with views being identified by means of a "Y" or Yes value in the View column (block 41 in FIG. 4). This means that a said user interface mechanism allows a dynamic view to appear as a folder, in the preferred embodiment of an endless hierarchy. When the user selects a folder for a dynamic view, the ocid of the related object class is obtained by searching for the ocid of said dynamic view in the class descriptors. Opening the folder for a dynamic view is treated as if the folder of said related object class is opened, with the only difference being that the said dynamic view is used to modify the said processing involved in opening folders in the manner described above. It is a novelty of this invention that the placement of restrictions and preconditions of viewing an endless hierarchy or an alternative equivalent display of the knowledge can be achieved without significantly adding to or making more complex the minimized domain of user interface. As will be apparent to one versed in the art, the said mechanism of providing dynamic views, when combined with selective manual or programmatic linking between users or groups of users on the one hand and particular dynamic views on the other, while denying access to object classes without using a dynamic view, can also be used to ensure security and for access right purposes so that specified users see only some of the object instances and links within the system of this invention and not others.

These and other features and capabilities of this invention will be apparent to those versed in this art. Although the invention has been discussed with respect to specific embodiments, many modifications to the specific embodiments are possible without deviating from the invention, the scope of which is determined solely by the appended claims.

What is claimed is:

1. A method for displaying link relationships among interlinked objects based on a primary object, wherein a plurality of objects reside in memory in one or more computer systems coupled to a display, wherein each object is an instance of one of a plurality of object classes, wherein memory coupled to the computer systems includes a first object related to a second object by a first link and the second object related to the first object by a second link; wherein each link is an instance of one of a plurality of link classes, the method comprising:

displaying a first view on the display of the objects with the first object as the primary object;

displaying the relationship between the objects, as represented by the links, on the display, to show the circular relationship of the first object related to the second object and the second object related to the first object by displaying the first object at least twice; and displaying a second view on the display of the objects and the relationships between objects based on the second object as the primary object.

2. The method of claim 1, further comprising designating a class to be excluded; and displaying the objects and relationships between objects on the display without displaying object instances of the designated class and relationships indicated by the link instances of the designated class.

3. The method of claim 1, wherein the objects are used in information systems that allow data to be added to existing objects.

4. The method of claim 1, wherein the links are stored in a single relational table.

5. An apparatus providing a user interface for displaying link relationships among interlinked objects based on a primary object, wherein a plurality of objects reside in one or more processing systems, wherein each object is an instance of one of a plurality of object classes, wherein the objects include a first object related to a second object by a first link and the second object related to the first object by a second link, wherein the apparatus includes a processor coupled to a user input device and display, the apparatus comprising:

one or more instructions for displaying a first view on the display of the objects starting from the first object;

one or more instructions for displaying the relationship between the objects, as represented by the links, to show the circular relationship of the first object related to the second object and the second object related to the first object by displaying the first object at least twice; and one or more instructions for displaying a second view on the display in response to signals from the user input device to select the second object, wherein the second view shows the objects and the relationships between the objects based on the second object as the starting object.

6. A computer-readable medium including instructions executable by a processor for providing a user interface for displaying link relationships among interlinked objects based on a primary object, wherein a plurality of objects reside in one or more processing systems, wherein each object is an instance of one of a plurality of object classes, wherein the objects include a first object related to a second object by a first link and the second object related to the first object by a second link, wherein the apparatus includes a processor coupled to a user input device and display, the computer-readable medium including:

one or more instructions for displaying a first view on the display of the objects starting from the first object;

one or more instructions for displaying the relationship between the objects, as represented by the links, to show the circular relationship of the first object related to the second object and the second object related to the first object by displaying the first object at least twice; and one or more instructions for displaying a second view on the display in response to signals from the user input device to select the second object, wherein the second view shows the objects and the relationships between the objects based on the second object as the starting object.

\* \* \* \* \*